United States Patent
Trollope et al.

(10) Patent No.: US 11,317,157 B2
(45) Date of Patent: *Apr. 26, 2022

(54) REMINDERS OF MEDIA CONTENT REFERENCED IN OTHER MEDIA CONTENT

(71) Applicant: GOOGLE LLC, Mountain View, CA (US)

(72) Inventors: Ingrid McAulay Trollope, Richmond (GB); Ant Oztaskent, Sutton (GB); Yaroslav Volovich, Cambridge (GB)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/067,407

(22) Filed: Oct. 9, 2020

(65) Prior Publication Data
US 2021/0029409 A1 Jan. 28, 2021

Related U.S. Application Data

(63) Continuation of application No. 16/506,929, filed on Jul. 9, 2019, now Pat. No. 10,841,657, which is a
(Continued)

(51) Int. Cl.
*H04N 21/472* (2011.01)
*H04N 21/442* (2011.01)
(Continued)

(52) U.S. Cl.
CPC ....... *H04N 21/47214* (2013.01); *G06F 16/43* (2019.01); *H04N 21/44008* (2013.01); *H04N 21/44222* (2013.01)

(58) Field of Classification Search
CPC ....... H04N 21/47214; H04N 21/44008; H04N 21/44222
See application file for complete search history.

(56) References Cited

U.S. PATENT DOCUMENTS 6,317,882 B1* 11/2001 Robbins ............... H04H 60/372
                                                                    348/E5.097
6,934,963 B1*  8/2005 Reynolds ............... H04N 7/163
                                                                    725/39
(Continued)

FOREIGN PATENT DOCUMENTS

CN    1624787    6/2005
CN    1972395    5/2007
(Continued)

OTHER PUBLICATIONS

Decision to Refuse a European Patent Application dated May 3, 2021 in EP Patent Application No. 17703584.7.
(Continued)

*Primary Examiner* — Nasser M Goodarzi
*Assistant Examiner* — Patrick A Ryan
(74) *Attorney, Agent, or Firm* — Byrne Poh LLP

(57) ABSTRACT

A method at a computing system includes receiving from a first device a request from a user indirectly referencing a media content item and content information including one or more portions of audio and/or video components of media playing in proximity to the first device in response to the user request, the media having originated from a third party content provider independent of the server system; and in response to receiving the user request and the content information from the first device: matching the content information received from the first device to a portion of content stored in the server system; and identifying the media content item based on the matching.

20 Claims, 12 Drawing Sheets

Related U.S. Application Data continuation of application No. 14/946,596, filed on Nov. 19, 2015, now Pat. No. 10,349,141.

(51) Int. Cl.
  *H04N 21/44* (2011.01)
  *G06F 16/43* (2019.01)

(56) References Cited

U.S. PATENT DOCUMENTS

| | | |
|---|---|---|
| 7,209,942 B1 | 4/2007 | Hori et al. |
| 7,281,220 B1 | 10/2007 | Rashkovskiy |
| 7,367,043 B2 | 4/2008 | Dudkiewicz et al. |
| 7,487,096 B1 | 2/2009 | Cox et al. |
| 7,788,080 B2 | 8/2010 | Graham et al. |
| 7,983,915 B2 | 7/2011 | Knight et al. |
| 8,010,988 B2 | 8/2011 | Cox |
| 8,108,535 B1 | 1/2012 | Roberts et al. |
| 8,122,094 B1* | 2/2012 | Kotab ............. H04N 21/47214 709/206 |
| 8,132,103 B1 | 3/2012 | Chowdhury et al. |
| 8,180,037 B1* | 5/2012 | Delker ............. H04N 21/47214 379/210.01 |
| 8,180,307 B2 | 5/2012 | Delker et al. |
| 8,370,380 B1 | 2/2013 | Kuraoka et al. |
| 8,433,431 B1 | 4/2013 | Master et al. |
| 8,433,577 B2 | 4/2013 | Sharifi et al. |
| 8,447,604 B1 | 5/2013 | Chang |
| 8,478,750 B2 | 7/2013 | Rao et al. |
| 8,484,203 B1 | 7/2013 | Clancy et al. |
| 8,516,533 B2 | 8/2013 | Davis et al. |
| 8,572,488 B2 | 10/2013 | Phillips et al. |
| 8,607,276 B2 | 12/2013 | Chang et al. |
| 8,645,125 B2 | 2/2014 | Liang et al. |
| 8,707,381 B2 | 4/2014 | Polumbus et al. |
| 8,751,502 B2 | 6/2014 | Agrawal |
| 8,839,308 B2 | 9/2014 | Howcroft |
| 8,868,558 B2 | 10/2014 | Blanco et al. |
| 8,989,521 B1 | 3/2015 | Ho et al. |
| 8,994,311 B1 | 3/2015 | Lynch et al. |
| 9,009,025 B1 | 4/2015 | Porter |
| 9,135,291 B2 | 9/2015 | Assam |
| 9,173,001 B1* | 10/2015 | Roberts .............. H04N 21/654 |
| 9,282,075 B2 | 3/2016 | Smalley et al. |
| 9,317,500 B2 | 4/2016 | Hwang |
| 9,462,230 B1 | 10/2016 | Agrawal et al. |
| 9,609,397 B1 | 3/2017 | Avegliano et al. |
| 9,727,644 B1 | 8/2017 | Teng et al. |
| 9,838,759 B2 | 12/2017 | Kirmse et al. |
| 9,854,324 B1 | 12/2017 | Panchaksharaiah et al. |
| 9,946,769 B2 | 4/2018 | Oztaskent et al. |
| 9,990,176 B1 | 6/2018 | Gray |
| 10,057,651 B1 | 8/2018 | Singh et al. |
| 10,121,165 B1 | 11/2018 | Mohajer et al. |
| 10,194,189 B1 | 1/2019 | Goetz et al. |
| 10,206,014 B2 | 2/2019 | Trollope et al. |
| 10,349,141 B2 | 7/2019 | Trollope et al. |
| 10,373,611 B2 | 8/2019 | Jeyachandran et al. |
| 10,417,344 B2 | 9/2019 | Futrell et al. |
| 10,417,405 B2 | 9/2019 | Cheyer |
| 10,445,429 B2 | 10/2019 | Ibrahim et al. |
| 10,453,443 B2 | 10/2019 | Kim |
| 10,474,753 B2 | 11/2019 | Bellegarda et al. |
| 10,659,850 B2 | 5/2020 | Kirmse et al. |
| 10,762,152 B2 | 9/2020 | Oztaskent et al. |
| 10,841,657 B2 | 11/2020 | Trollope et al. |
| 2002/0092021 A1 | 7/2002 | Yap et al. |
| 2002/0120925 A1 | 8/2002 | Logan |
| 2003/0093790 A1 | 5/2003 | Logan et al. |
| 2003/0135490 A1 | 7/2003 | Barrett et al. |
| 2004/0004599 A1 | 1/2004 | Shepard et al. |
| 2005/0015491 A1 | 1/2005 | Koeppel |
| 2005/0059432 A1 | 3/2005 | Choi |
| 2006/0004871 A1 | 1/2006 | Hayama et al. |
| 2006/0100987 A1 | 5/2006 | Leurs |
| 2007/0130580 A1 | 6/2007 | Covell et al. |
| 2007/0244902 A1 | 10/2007 | Seide et al. |
| 2008/0016046 A1 | 1/2008 | Guha |
| 2008/0086742 A1 | 4/2008 | Aldrey et al. |
| 2008/0148320 A1* | 6/2008 | Howcroft ............ H04N 21/4113 725/61 |
| 2008/0154870 A1 | 6/2008 | Evermann et al. |
| 2008/0270449 A1 | 10/2008 | Gossweiler et al. |
| 2008/0275764 A1 | 11/2008 | Wilson et al. |
| 2008/0306807 A1 | 12/2008 | Amento et al. |
| 2009/0055385 A1 | 2/2009 | Jeon et al. |
| 2009/0083281 A1 | 3/2009 | Sarig et al. |
| 2009/0254823 A1* | 10/2009 | Barrett ................. H04N 21/435 715/716 |
| 2011/0063503 A1 | 3/2011 | Brand et al. |
| 2011/0066961 A1 | 3/2011 | Wang et al. |
| 2011/0078020 A1 | 3/2011 | LaJoie et al. |
| 2011/0078729 A1* | 3/2011 | LaJoie ................. H04N 21/254 725/36 |
| 2011/0137920 A1 | 6/2011 | Cohen et al. |
| 2011/0173194 A1 | 7/2011 | Sloo et al. |
| 2011/0218946 A1 | 9/2011 | Stern et al. |
| 2011/0238754 A1 | 9/2011 | Dasilva et al. |
| 2011/0246383 A1 | 10/2011 | Gibson et al. |
| 2011/0247042 A1* | 10/2011 | Mallinson ........ H04N 21/44008 725/86 |
| 2011/0273455 A1 | 11/2011 | Powar et al. |
| 2011/0289532 A1* | 11/2011 | Yu .................... H04N 21/41407 725/38 |
| 2012/0131060 A1 | 5/2012 | Heidasch |
| 2012/0150907 A1 | 6/2012 | Chowdhury et al. |
| 2012/0189273 A1 | 7/2012 | Folgner et al. |
| 2012/0191231 A1* | 7/2012 | Wang .................... G06F 16/683 700/94 |
| 2012/0278331 A1 | 11/2012 | Campbell et al. |
| 2012/0311074 A1 | 12/2012 | Arini et al. |
| 2012/0311624 A1 | 12/2012 | Oskolkov et al. |
| 2013/0006627 A1 | 1/2013 | Guthery et al. |
| 2013/0031162 A1 | 1/2013 | Willis et al. |
| 2013/0111514 A1 | 5/2013 | Slavin et al. |
| 2013/0144603 A1 | 6/2013 | Lord et al. |
| 2013/0149689 A1 | 6/2013 | DeGross |
| 2013/0160038 A1 | 6/2013 | Slaney et al. |
| 2013/0170813 A1 | 7/2013 | Woods et al. |
| 2013/0173796 A1 | 7/2013 | Grab et al. |
| 2013/0185711 A1 | 7/2013 | Morales |
| 2013/0198642 A1 | 8/2013 | Carney et al. |
| 2013/0291019 A1 | 10/2013 | Burkitt et al. |
| 2013/0311408 A1 | 11/2013 | Bagga et al. |
| 2013/0325869 A1 | 12/2013 | Reiley et al. |
| 2013/0326406 A1 | 12/2013 | Reiley et al. |
| 2014/0067825 A1 | 3/2014 | Oztaskent et al. |
| 2014/0089424 A1 | 3/2014 | Oztaskent et al. |
| 2014/0161416 A1 | 6/2014 | Chou et al. |
| 2014/0200888 A1 | 7/2014 | Liu et al. |
| 2014/0280686 A1* | 9/2014 | Herlein ................. G06Q 30/02 709/213 |
| 2014/0280879 A1 | 9/2014 | Skolicki |
| 2014/0280983 A1 | 9/2014 | Paluch et al. |
| 2014/0297633 A1 | 10/2014 | Brooks et al. |
| 2015/0012840 A1* | 1/2015 | Maldari ............. H04N 21/4788 715/748 |
| 2015/0067061 A1 | 3/2015 | Poston |
| 2015/0149482 A1 | 5/2015 | Finkelsetein et al. |
| 2015/0170325 A1 | 6/2015 | Abecassis et al. |
| 2015/0229982 A1* | 8/2015 | Scott .................... H04N 21/812 386/293 |
| 2015/0339382 A1 | 11/2015 | Skolicki |
| 2015/0347903 A1 | 12/2015 | Saxena et al. |
| 2015/0356102 A1 | 12/2015 | Cohen et al. |
| 2015/0373428 A1 | 12/2015 | Trollope et al. |
| 2016/0037222 A1* | 2/2016 | Lewis .............. H04N 21/43637 725/42 |
| 2016/0042766 A1 | 2/2016 | Kummer |
| 2016/0154887 A1 | 6/2016 | Zhao |
| 2016/0203112 A1 | 7/2016 | Asamani et al. |

(56) References Cited

U.S. PATENT DOCUMENTS

2016/0212495 A1* 7/2016 Chang .............. H04N 21/812
2017/0150225 A1 5/2017 Trollope et al.

FOREIGN PATENT DOCUMENTS

| | | |
|---|---|---|
| CN | 101001427 | 7/2007 |
| CN | 101329867 | 12/2008 |
| CN | 101464881 | 6/2009 |
| CN | 101499915 | 8/2009 |
| CN | 102419945 | 4/2012 |
| CN | 103064824 | 4/2013 |
| CN | 103714087 | 4/2014 |
| CN | 103748897 | 4/2014 |
| CN | 104503374 | 4/2015 |
| CN | 104808921 | 7/2015 |
| EP | 2023578 | 2/2009 |
| EP | 2464107 | 6/2012 |
| EP | 2515505 | 10/2012 |
| KR | 100582196 | 5/2006 |
| WO | WO 200103008 | 1/2001 |
| WO | WO 2005045806 | 5/2005 |
| WO | WO 2011069035 | 6/2011 |
| WO | WO 2012166739 | 12/2012 |
| WO | WO 2013037081 | 3/2013 |
| WO | WO 2014035554 | 3/2014 |
| WO | WO 2015196115 | 12/2015 |

OTHER PUBLICATIONS

Examination Report dated Jun. 24, 2019 in EP Patent Application No. 16810144.2.
Examination Report dated Jun. 30, 2021 in EP Patent Application No. 19189325.4.
Examination Report dated Jul. 16, 2018 in EP Patent Application No. 15733981.3.
Examination Report dated Jul. 23, 2018 in EP Patent Application No. 15744395.3.
Examination Report dated Oct. 16, 2020 in EP Patent Application No. 19189325.4.
Examination Report dated Nov. 8, 2019 in EP Patent Application No. 17703584.7.
Extended European Search Report dated Aug. 29, 2019 in EP Patent Application No. 19189325.4.
Extended European Search Report dated Oct. 15, 2020 in EP Patent Application No. 20183106.2.
International Search Report and Written Opinion dated Jan. 30, 2017 in International Patent Application No. PCT/US2016/062586.
International Search Report and Written Opinion dated Mar. 2, 2017 in International Patent Application No. PCT/US2017/014737.
International Search Report and Written Opinion dated Oct. 6, 2015 in International Patent Application No. PCT/US2015/036756.
International Search Report and Written Opinion dated Oct. 6, 2015 in International Patent Application No. PCT/US2015/036819.
Notice of Allowance dated Jan. 15, 2020 in U.S. Appl. No. 16/240,608.
Notice of Allowance dated Feb. 21, 2019 in U.S. Appl. No. 14/946,596.
Notice of Allowance dated Mar. 15, 2021 in U.S. Appl. No. 16/847,224.
Notice of Allowance dated Apr. 27, 2020 in U.S. Appl. No. 15/727,473.
Notice of Allowance dated Jun. 25, 2020 in U.S. Appl. No. 16/506,929.
Notice of Allowance dated Jun. 26, 2017 in U.S. Appl. No. 14/311,211.
Notice of Allowance dated Nov. 23, 2018 in U.S. Appl. No. 14/488,213.
Notice of Grant dated Oct. 29, 2020 in CN Patent Application No. 201580033369.5.
Office Action dated Jan. 11, 2019 in U.S. Appl. No. 15/006,008.
Office Action dated Jan. 13, 2020 in U.S. Appl. No. 15/727,473.
Office Action dated Mar. 14, 2017 in U.S. Appl. No. 14/311,211.
Office Action dated Mar. 28, 2018 in U.S. Appl. No. 15/006,008.
Office Action dated Apr. 5, 2017 in U.S. Appl. No. 15/006,008.
Office Action dated May 25, 2020 in CN Patent Application No. 201580033370.8.
Office Action dated May 27, 2020 in CN Patent Application No. 201580033369.5.
Office Action dated May 31, 2018 in U.S. Appl. No. 14/946,596.
Office Action dated Jun. 1, 2017 in U.S. Appl. No. 14/946,596.
Office Action dated Jun. 1, 2018 in U.S. Appl. No. 14/488,213.
Office Action dated Jun. 30, 2021 in CN Patent Application No. 201780003574.6.
Office Action dated Jul. 1, 2016 in U.S. Appl. No. 14/488,213.
Office Action dated Jul. 2, 2021 in CN Patent Application No. 201680048723.6.
Office Action dated Jul. 29, 2016 in U.S. Appl. No. 14/311,211.
Office Action dated Jul. 29, 2019 in U.S. Appl. No. 15/006,008.
Office Action dated Aug. 4, 2021 in CN Patent Application No. 202011288730.8.
Office Action dated Sep. 21, 2018 in U.S. Appl. No. 15/006,008.
Office Action dated Sep. 25, 2017 in U.S. Appl. No. 14/488,213.
Office Action dated Sep. 27, 2019 in U.S. Appl. No. 15/727,473.
Office Action dated Sep. 29, 2019 in CN Patent Application No. 201580033370.8.
Office Action dated Oct. 6, 2020 in U.S. Appl. No. 16/847,224.
Office Action dated Oct. 18, 2017 in U.S. Appl. No. 14/946,596.
Office Action dated Oct. 23, 2019 in U.S. Appl. No. 15/727,473.
Office Action dated Oct. 24, 2019 in CN Patent Application No. 201580033369.5.
Office Action dated Nov. 16, 2017 in U.S. Appl. No. 15/006,008.
Office Action dated Nov. 21, 2016 in U.S. Appl. No. 14/946,596.
Office Action dated Dec. 2, 2019 in U.S. Appl. No. 16/240,608.
Summons to Attend Oral Proceedings dated Feb. 21, 2019 in EP Patent Application No. 15733981.3.
Summons to Attend Oral Proceedings dated Jun. 12, 2020 in EP Patent Application No. 16810144.2.
Summons to Attend Oral Proceedings dated Aug. 21, 2020 in EP Patent Application No. 17703584.7.
Examination Report dated Nov. 9, 2021 in EP Patent Application No. 20183106.2.
Office Action dated Oct. 1, 2021 in U.S. Appl. No. 16/935,018.

* cited by examiner

REMINDERS OF MEDIA CONTENT REFERENCED IN OTHER MEDIA CONTENT

RELATED APPLICATIONS

This application is a continuation of U.S. patent application Ser. No. 16/506,929, filed Jul. 9, 2019, which is a continuation of U.S. patent application Ser. No. 14/946,596, filed Nov. 19, 2015 and issued as U.S. Pat. No. 10,349,141 on Jul. 9, 2019, each of which is hereby incorporated by reference in its entirety.

TECHNICAL FIELD

The present application describes systems and methods for identifying references to media content in other media content and setting reminders for the referenced media content.

BACKGROUND

Media content may include references to other media content. For example, a television awards show is likely to reference television content external to the television awards show (e.g., shows associated with the nominees for the awards). A user watching the awards show may become interested in watching the referenced television content due to the references in the awards show. Typically, the user will search for the television content he is interested in watching while still watching the awards show or after finishing watching the awards show. Both options are inefficient, as one distracts the user from the awards show, and the other risks the user forgetting the particular referenced television content that attracted his interest. Thus, what is needed is an efficient way to remind the user of media content referenced in media content the user is watching with little or no distraction from the media content the user is watching.

SUMMARY

In accordance with some implementations, methods, systems, and computer readable storage media are provided to set a reminder for an event associated with an entity referenced in media content. In accordance with some implementations, a method at a computing system includes receiving a request from a user, and in response to the user request: identifying a first media content item playing on a first client device concurrently with the user request; identifying a playback position in the first media content item temporally proximate to the user request; identifying a reference to an entity within a content portion of the first media content item, where the content portion corresponds to the identified playback position; identifying an event associated with the referenced entity; and setting a reminder of the event for the user.

In accordance with some implementations, a computer system includes one or more processors, memory, and one or more programs, where the one or more programs are stored in the memory and configured to be executed by the one or more programs. The one or more programs include instructions for: receiving a request from a user; and in response to the user request: identifying a first media content item playing on a first client device concurrently with the user request; identifying a playback position in the first media content item temporally proximate to the user request; identifying a reference to an entity within a content portion of the first media content item, wherein the content portion corresponds to the identified playback position; identifying an event associated with the referenced entity; and setting a reminder of the event for the user.

In accordance with some implementations, a non-transitory computer readable storage medium stores one or more programs. The one or more programs include instructions which, when executed by a computer system with one or more processors, cause the computer system to: receive a request from a user; and in response to the user request: identify a first media content item playing on a first client device concurrently with the user request; identify a playback position in the first media content item temporally proximate to the user request; identify a reference to an entity within a content portion of the first media content item, wherein the content portion corresponds to the identified playback position; identify an event associated with the referenced entity; and set a reminder of the event for the user.

BRIEF DESCRIPTION OF THE DRAWINGS

Like reference numerals refer to corresponding parts throughout the drawings.

DESCRIPTION OF IMPLEMENTATIONS

The methods and systems described herein disclose systems and methods for reminders of events (e.g., release of media content, live event, etc.) associated with entities referenced in a media content item. Such methods and systems provide an effective way for a consumer of media content to remember and explore media content and other events the consumer became interested in due to mentions or references in other media content.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1A:
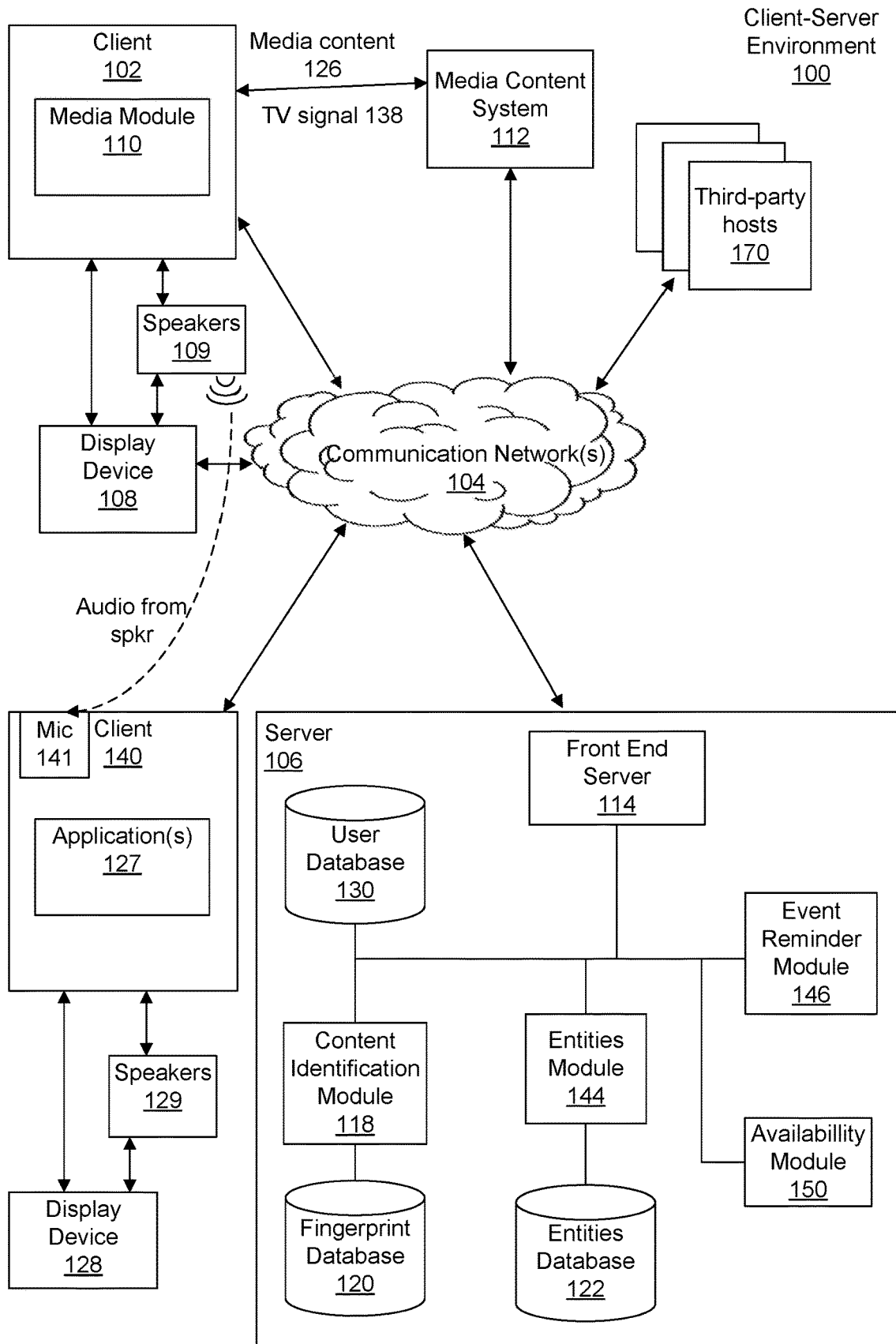
FIGS. 1A-1B are block diagrams illustrating distributed client-server systems in accordance with some implementations.

FIG. 1A is a block diagram illustrating a client-server environment in accordance with some implementations. The client-server environment 100 includes a client device 102, a client device 140, one or more communication networks 104, a server system 106, a media content system 112, and optionally one or more third-party hosts 170. The communication network(s) 104 communicatively couples the server system 106, the client device 102, the client device 140, the media content system 112, and third-party hosts 170.

In some implementations, the server system 106 is implemented as a single server system, while in other implementations the server system 106 is implemented as a distributed system of multiple servers. Solely for convenience of explanation, the server system 106 is described below as being implemented on a single server system. In some implementations, the media content system 112 is implemented as a single server system, while in other implementations the media content system 112 is implemented as a distributed system of multiple servers. Solely, for convenience of explanation, the media content system 112 is described below as being implemented on a single server system. In some implementations, the functionality of the media content system 112 and the server system 106 are combined into one (single or distributed) server system.

The communication network(s) 104 can be any wired or wireless local area network (LAN) and/or wide area network (WAN), such as an intranet, an extranet, or the Internet. It is sufficient that the communication network 104 provides communication capability between the client devices 102 and 140, the server system 106, the media content system 112, and the third-party hosts 170. In some implementations, the communication network 104 uses the HyperText Transport Protocol (HTTP) to transport information using the Transmission Control Protocol/Internet Protocol (TCP/IP). HTTP permits client devices 102 and 140 to access various resources available via the communication network 104. The various implementations described herein, however, are not limited to the use of any particular protocol.

The client device 102 is any suitable computer device that, in some implementations, is capable of connecting to the communication network 104, receiving media content 126 (e.g., a media content item with video and/or audio content), extracting information from the media content item 126, and presenting the media content item 126 on the display device 108 or through speaker(s) 109. In some implementations, the client device 102 is a set top box that includes components to receive and present video streams. For example, the client device 102 can be a set top box for receiving cable TV and/or satellite TV, a digital video recorder (DVR), a digital media receiver, a TV tuner, a computer, and/or any other device that outputs TV signals. In some other implementations, the client device 102 is a computer, laptop computer a tablet device, a netbook, a mobile phone, a smartphone, tablet device, a gaming device, a multimedia player device, or any other device that is capable of receiving media content 126 (e.g., as video streams through the network 104). In some implementations, the client device 102 displays a video stream on the display device 108. In some implementations the client device 102 is a conventional TV display that is not connected to the Internet and that displays digital and/or analog TV content via over the air broadcasts or a satellite or cable connection.

In some implementations, the display device 108 is any display for presenting video content to a user. In some implementations, the display device 108 is the display of a television, or a computer monitor, that is configured to receive and display audio and video signals or other digital content from the client device 102. In some implementations, the display device 108 is an electronic device with a central processing unit, memory and a display that is configured to receive and display audio and video signals or other digital content from the client device 102. For example, the display device can be a LCD screen, a tablet device, a mobile telephone, a projector, or other type of video display system. The display 108 can be coupled to the client device 102 via a wireless or wired connection.

In some implementations, the client device 102 includes a video module 110 that receives video content from the media content system 112 or elsewhere, extracts content information from the video content (e.g., a video stream) that is playing on the client device 102 and sends the content information to the server 106. In some implementations, the client device 102 includes a similar module for audio-only media content.

In some implementations, the client device 102 receives media content 126 via a TV signal 138. As used herein, a TV signal is an electrical, optical, or other type of data transmitting medium that includes audio and/or video components corresponding to a TV channel. In some implementations, the TV signal is a terrestrial over-the-air TV broadcast signal or a signal distributed/broadcast on a cable system or a satellite system. In some implementations, the TV signal 138 is transmitted as data over a network connection. For example, the client device 102 can receive video streams from an Internet connection. Audio and video components of a TV signal are sometimes referred to herein as audio signals and video signals. In some implementations, a TV signal corresponds to a TV channel that is being displayed on the display device 108.

In some implementations, the media content item 126 is live television content (e.g., first-run television content, live events shown on television). In some implementations, the media content is previously shown content (e.g., a re-run shown on a broadcast or non-broadcast channel, a later showing of content to accommodate time zone differences). In some implementations, the media content is recorded content (e.g., content recorded in and played back from a DVR; content fully downloaded to and stored in, and played back from, non-volatile memory). In some implementations, the media content is streaming content (e.g. online video).

In some implementations, the media content item 126 includes audible sound or content (e.g., audio content). The audible sound or content includes audible verbal information or content (e.g., spoken dialogue or speech, music with lyrics), and optionally audible non-verbal information or content (e.g., tones, sound effects, music without lyrics). In some implementations, the audible sound is carried in an audio track in the media content item 126. In some implementations, a TV signal carries information for audible sound corresponding to an audio track on a TV channel. In some implementations, the audible sound is produced by speaker(s) associated with the display device 108 or the client device 102 (e.g. speaker(s) 109). In some implementations, the media content item 126 also includes audio (e.g., tones) that is not audible to the human ear (i.e., frequency not within the range for human-audible sound) but which carries information (e.g., program information, broadcaster information) encoded within.

In some implementations, a TV signal carries information or data for subtitles or captions (e.g., closed captions) that correspond to audible verbal information (e.g., spoken speech, spoken monologue and/or dialogue, song lyrics) in the audio track. The subtitles or captions are a textual transcription of verbal information in the media content item. The subtitles or captions can be presented concurrently along with the corresponding video content. For convenience, subtitles and captions are hereinafter referred to collectively as "subtitles," and subtitles/captions data as "subtitles data."

The client device 140 may be any suitable computer device that is capable of connecting to the communication network 104, such as a computer, a laptop computer, a tablet device, a netbook, an internet kiosk, a personal digital assistant, a mobile phone, a gaming device, or any other device that is capable of communicating with the server system 106. The client device 140 typically includes one or more processors, non-volatile memory such as a hard disk drive and a display. The client device 140 may also have input devices such as a keyboard and a mouse (as shown in FIG. 3B). In some implementations, the client device 140 includes touch screen displays.

In some implementations, the client device 140 is connected to a display device 128. The display device 128 can be any display for presenting video content to a user. In some implementations, the display device 128 is the display of a television, or a computer monitor, that is configured to receive and display audio and video signals or other digital content from the client device 140. In some implementations, the display device 128 is an electronic device with a central processing unit, memory and a display that is configured to receive and display audio and video signals or other digital content from the client device 140. In some implementations, the display device 128 is a LCD screen, a tablet device, a mobile telephone, a projector, or any other type of video display system. In some implementations, the client device 140 is connected to the display device 128. In some implementations, the display device 128 includes, or is otherwise connected to, speaker(s) capable of producing an audible stream corresponding to the audio component of a TV signal or video stream.

In some implementations, the client device 140 is connected to the client device 102 via a wireless or wired connection. In some implementations, where such connection exists, the client device 140 optionally operates in accordance with instructions, information and/or content (collectively second screen information) provided by the client device 102. In some implementations, the client device 102 issues instructions to the client device 140 that cause the client device 140 to present on the display 128 and/or the speaker(s) 129 content that is complementary, or related to, content that is being presented by the client device 102 on the display 108 and/or speaker(s) 109. In some other implementations, the server 106 issues instructions to the client device 140 that cause the client device 140 to present on the display 128 and/or the speaker(s) 129 content that is complementary, or related to, content that is being presented by the client device 102 on the display 108 and/or speaker(s) 109.

In some implementations, the client device 140 includes a microphone 141 that enables the client device 140 to receive sounds (e.g., audio content, including human-audible content (e.g., speech, music) and human-inaudible content (e.g., inaudible tones)) from the client device 102 output through speaker(s) 109, as the client device 102 plays the media content item 126. The microphone 141 enables the client device 140 to capture and optionally store the audio content or soundtrack that is associated with the media content item 126 as the audio content/soundtrack is being output. In the same manner as described herein for the client device 102, the client device 140 may store this information locally and then send to the server 106 content information that is any one or more of: fingerprints of the stored audio content, the audio content itself, portions/snippets of the audio content, or fingerprints of the portions of the audio content. In this way, the server 106 can identify the media content item 126 being played on client device 102 even if the client device 102 on which the media content item 126 is being played is not an Internet-enabled device, such as a television set lacking network connectivity, a device not connected to the Internet (temporarily or permanently) and therefore unable to send the content information, or a device that does not have the capability to record or fingerprint media information related to the media content item 126. Such an arrangement (i.e., where the second screen device 140 stores and sends the content information to the server 106) allows a user to receive from the server 106 second screen content triggered in response to the content information no matter where the viewer is consuming media content 126 and information related to the media content item 126, such as information related to entities in the media content item 126.

In some implementations, the microphone 141 also enables the client device 140 to receive voice inputs from the user. The voice inputs include, for example, commands to perform particular operations, and queries or requests for information or content. In some implementations, content information for media content 126 playing at the client 102 is sent for identification in response to user input (e.g., a user command or request for a reminder).

In some implementations, the content information sent to the server 106 from either the client device 102 or 140 includes any one or more of: fingerprints of the stored subtitles data, the subtitles data itself, portions/snippets of the subtitles data, or fingerprints of the portions of the subtitles data. In this way, the server 106 can identify the media content item 126 being played on the client device 102 even if, for example, the volume level on the client device 102 is too low for the audio content to be audibly captured by the client device 140, the audio content as output by the client device 102 is distorted (e.g., because of poor transmission quality from the media content system 112, because of a lag in processing capability at the client device 102, because of background sound distorting the output audio content, etc.), or if the speaker(s) 109 are otherwise not outputting audio content (e.g., speaker(s) 109 are powered off or broken).

In some implementations, the client device 140 includes one or more applications 127. As discussed in greater detail herein, the one or more applications 127 receive and present information received from the server 106, including, for example, entities in media content, information about entities in media content, and reminders of events. In some implementations, the one or more applications 127 receive and present information related to the audible verbal information or subtitles data within the media content from the server 106. In some implementations, the applications 127 include an assistant application. An assistant application obtains and presents information (e.g., reminders) relevant to the user based on a variety of signals, including, but not limited to, the user's demographic information, the current location of the device and/or the user, the user's calendar, the user's contact list, the user's social network(s), the user's search history, the user's web browsing history, the device's and/or the user's location history, the user's stated preferences, the user's content viewing history, and the content being currently presented to the user.

In some implementations, an application 127 (e.g., an assistant application) at the client device 140 receives a user command or request to set a reminder for what the user perceives as a mention or reference to an entity in a media content item playing at the client device 102. The application processes the command, generates content information from the media content item playing at the client device 102 in accordance with the command, and sends the content information to the server 106 for identification of the playing media content item, identification of entities mentioned or referenced in the playing media content around when the command was received, and identification of events associated with or corresponding to the identified entities. The application 127 sets a reminder for an identified event in accordance with the command or request. In some implementations, the application 127 includes an affordance for a user to make the command or request (e.g., a virtual button). In some implementations, the application 127 accepts the user command or request in a voice input from the user to the application 127.

In some implementations, the server system 106 includes a front end server 114 that facilitates communication between the server system 106 and client devices 102 and 140, media content system 112, and third-party hosts 170 via the network(s) 104. The front end server 114 receives content information from the client device 102 and/or the client device 140. In some implementations, the content information is a video or audio stream or a portion thereof. In some implementations, the content information is derived from a media content item 126 playing on the client device 102 (e.g., a portion of a video stream playing on the client device 102 and one or more fingerprints of that portion). In some implementations, the front end server 114 is configured to send content or content links to a client device 102 or 140. In some implementations, the front end server 114 is configured to send or receive one or more videos or audio pieces, or video or audio streams.

According to some implementations, a video or video stream is a sequence of images or frames representing scenes in motion. A video should be distinguished from a still image. A video displays a number of images or frames per second. For example, a video displays 24 or 30 consecutive frames per second. In contrast, an image is not necessarily associated with any other image.

In some implementations, the server system 106 includes a user database 130 that stores user data. In some implementations, the user database 130 is a distributed database. The user data stored in the user database 130 includes, for example, log-in information, user profiles, reminders of media content, and watch lists of media content.

In some implementations, the server system 106 includes a content identification module 118 configured to receive content information from the client device 102 and/or the client device 140, match the content information to a content fingerprint in a fingerprint database 120, and identify the media content item 126 (e.g., a "video content item," such as a movie, television series episode, video clip, or any other distinct piece of video content consumed as a distinct file or as a stream; an "audio content item," such as a song, audio clip, or any other distinct piece of audio content consumed as a distinct file or as a stream) being presented at the client device 102 based on the matching of the content information and the content fingerprint. In some implementations, the content identification module also identifies the current position in the media content item 126 (e.g., the position or how far in the video content is being presented on the client device 102). The identity of the media content item 126 and the current position in the media content item 126 is passed onto an entities module 144, which identifies one or more entities related to the identified media content item 126 and optionally the current position in the identified media content in an entities database 122. In some implementations, entities include media content (e.g., movies, television programs, songs, albums, radio shows, podcasts, episodes of any of the above, etc.), artists and artist groups (e.g., individual singers, bands, orchestras, performance troupes, etc.), sports teams, and other individuals and organizations.

The server 106 includes an entities database or repository 122. The entities database 122 is a database of entities associated with media content. As used herein, an entity is any distinct existence, being, or otherwise objectively identifiable item that is associated with media content. In some implementations, entities include, without limitation, titles, people, places, music, things, products, quotations, events, and awards. For example, titles include movie titles, series titles (e.g., television series titles), and episode titles (e.g., television episodes titles). People include cast members (e.g., actors), crew members (e.g., director, producer, music composer, etc.), in-story characters, competition contestants, competition judges, hosts, guests, and people mentioned. Places include in-story locations, filming locations, and locations mentioned. Music includes songs and compositions used in the video content. Things include in-story objects (e.g., lightsabers in "Star Wars"). Products include any good, service, or item mentioned or shown in video content (e.g., mentioned book, products included in video content due to product placement). Quotations include pieces of spoken dialogue from video content, such as lines and catchphrases spoken by characters or non-fictional people in video content (e.g., "May the Force be with you."). Awards include any awards associated with a piece of video content and its entities (e.g., best actor, best director, best song, etc.). It should be appreciated that the entity types or categories and corresponding descriptions or definitions described above are examples and are non-exhaustive. Other types or categories of entities are possible, and the types or categories of entities described above may have broader or narrower definitions than as described above.

In some implementations, the entities database 122 also includes a graph network that indicates associations between entities. For example, a movie entity (e.g., the movie title entity as the entity representing to the movie) is linked to its cast member entities, crew member entities, in-story location entities, quotation entities, and so on. The graph network may be implemented using any suitable data structure.

In some implementations, the entities database 122 also includes information regarding when an entity appears, is mentioned, or is said (e.g., in the case of a quotation) in media content. For example, the entities database 122 stores information on, for example, when a particular movie title is mentioned in a media content item (as identified by a title (e.g., movie title, television show title) of the media content item). Such information may be stored as times and/or time ranges within a media content item corresponding to the entity corresponding to the media content item. Similarly, the entities database 122 stores information on when within a media content item an event is mentioned, when a thing appears or is mentioned, when a product appears or is mentioned, and so forth. In some implementations, the entities database 122 also includes temporal information associated with entities (e.g., information on events associated with entities and event availability information). For example, for an entity that is a TV program, the entities database 122 can store known current and future air dates and times, and optionally past air times (e.g., date and time of debut airing), for the program. As another example, for a performer entity (e.g., a singer, an orchestra, a dance troupe, etc.), the entities database 122 can store known current and future performance dates, and optionally past performance dates, for the performer. In some other implementations, temporal information associated with entities is stored in another database.

In some implementations, entities in the entities database 122 are also associated with non-entities outside of the entities database. For example, a person entity in the entities database 122 may include links to web pages of news stories associated with the person.

In some implementations, the server 106 also includes textual information corresponding to audible verbal information in media content. The textual information is displayable information, in written textual form, corresponding to audible verbal information in video content. Textual information includes, for example, transcription of spoken speech (e.g., dialogue, monologue, etc.) in a video, song lyrics, and translations and/or romanizations of spoken speech or lyrics. Sources of textual information include, for example, subtitles data, online documents (e.g., transcripts posted online), and speech-to-text conversions of audible verbal information from the media content.

In some implementations, the server 106 stores textual information, and links to sources of textual information (e.g., a link to a document hosted at a third party host 170), in the entities database 122. Within the entities database 122, respective textual information and the corresponding sources may be associated with respective entities (e.g., the person who sung the lyrics; the person who spoke the speech; the movie or television series in which the song or speech was sung or spoken, respectively). In some other implementations, the textual information and the links to the sources thereof are stored in a separate database or repository (not shown) in the server 106. Respective textual information and corresponding sources in the separate database/repository may be associated with respective entities in the entities database 122. For sake of convenience, the description below assumes that the textual information and the links to the sources thereof are stored in the entities database 122.

In some implementations, the server system 106 includes a fingerprint database 120 that stores content fingerprints. As used herein, a content fingerprint is any type of condensed or compact representation, or signature, of the content of a media content item (e.g., video stream and/or audio stream and/or subtitles data corresponding to the video stream and/or audio stream). In some implementations, a fingerprint may represent a clip (such as several seconds, minutes, or hours) or a portion of a video stream or audio stream or the corresponding subtitles data. Or, a fingerprint may represent a single instant of a video stream or audio stream or subtitles data (e.g., a fingerprint of single frame of a video or of the audio associated with that frame of video or the subtitles corresponding to that frame of video). Furthermore, since media content may change over time, corresponding fingerprints of that media content may also change over time. In some implementations, the fingerprint database 120 is a distributed database.

In some implementations, the server 106 includes an entities module 144, an event reminder module 146, and an availability module 150. In some implementations, the entities module 144 identifies and extracts entities related to media content and stores the extracted entities in the entities database 122. In some implementations, the entities module 144 extracts entities related to media content from media content (e.g., from content information) and from other sources (e.g., web pages hosted by third party hosts 170). In some implementations, the entities module 144 also identifies one or more entities in media content 126, retrieves information on the identified entities from the entities database 122, and provides the information to the front end server 114, for sending to a client device (e.g., client device 140) for presentation and/or to another module for further processing or operation.

In some implementations, the server system 106 includes an event reminder module 146 and optionally an availability module 150. The event reminder module 146 identifies events associated with or corresponding to entities and sets reminders for identified events in accordance with user commands and requests. In some implementations, examples of events include live events (e.g., concerts, speeches, plays, sporting events, elections, etc.) and release or availability of a media content item (e.g., a movie, a television show) on a respective platform (e.g., in theaters, for digital download or stream, for sale in physical media, on broadcast television, on on-demand television, etc.). In some implementations, an event is also an entity in the entities database 122. A reminder, as used herein, is any data or information, presentable to the user, that reminds, alerts, or notifies the user of an event and, optionally, the availability of that event and/or means of accessing the event. In some implementations, modes of reminder include: an alert (e.g., a pop-up alert), a notification, a message, a calendar event added to a calendar associated with the user, a calendar reminder, a bookmark, a scheduled recording in a digital video recorder (DVR) or similar device or application, and an item or entry in a list associated with the user (e.g., a media watch list, a tasks list, a wish list).

The availability module 150 checks the availability of events across multiple sources, including but not limited to: organizers and/or promoters and/or ticket sellers of events (e.g., event schedules and announcements posted by organizers, promoters, and/or ticket sellers), streaming sites, media content sellers (e.g., sellers of media content in physical media and/or digital downloads), news outlets (e.g., web sites for local, regional and national newspapers), community information sources (e.g., local and special interest publications and web sites and library catalogs), and television delivery networks (e.g., broadcast, cable, satellite, and IPTV television platforms) and program guides for these networks. The availability module 150 checks these sources hosted at third-party hosts 170 (e.g., seller websites, websites of event ticket sellers, streaming sites, etc.) and the media content system 112 for availability of events (e.g., when media content becomes available for streaming or purchase in physical media and/or digital download, when media content is removed from streaming availability, air dates and times for media content, when an event is scheduled, if tickets for an event is still available, when a movie opens in theaters, etc.). In some implementations, the availability module 150 stores the event information in the entities database 122. In some implementations, the availability module 150 checks the entities database 122 (or a separate database) first for event and availability information (e.g., known current and future performance dates) before checking third-party hosts 170.

In some implementations, the front end server 114 receives a user request from the client device 140, the request including content information (e.g., portion/snippet of audio content, etc.) corresponding to a media content item 126 being played on the client device 102. The user request is a request to set a reminder for an event associated with what the user perceives as an entity mentioned or referenced in the media content item 126. The media content item 126 and the position in the media content item 126 at the time of the user request are identified based on the content information, the entity mentioned/referenced proximate to the identified position in the media content item 126 is identified, an event associated with the identified entity is identified, and a reminder is set for the identified event. In some implementations, the user issues the request by verbal command (e.g., "set a reminder for that show" or "remind me when that concert is in our area" or "let me know when that book is available at my library") that is received by the microphone 141, recorded or transcribed by the client device 140, and then transmitted to the server for further processing. In some implementations, the user issues the command through a user interface of an application 127 that executes on the client device 140. For example, in some implementations, the user interface of an application 127 provides a "remind me" button that, when selected by user, triggers collection by the client 140 of the content information related to the currently playing media content, transmits that content information to the server, displays possible reminder and options (e.g., displays a list of events identified by the server for which reminders can be set and delivery, recurrence and other options for those reminders) and then assists the user in setting the desired reminder(s).

In some implementations, the distributed system 100 also includes one or more third party hosts 170. The third party hosts 170 hosts content. For example, a third party host 170 may host media content (e.g., a media content streaming site). As another example, a third party 170 may host content that may be used to determine availability of events (e.g., an events schedule, a shopping site page for media content sold in physical media, etc.).

Figure 1B:
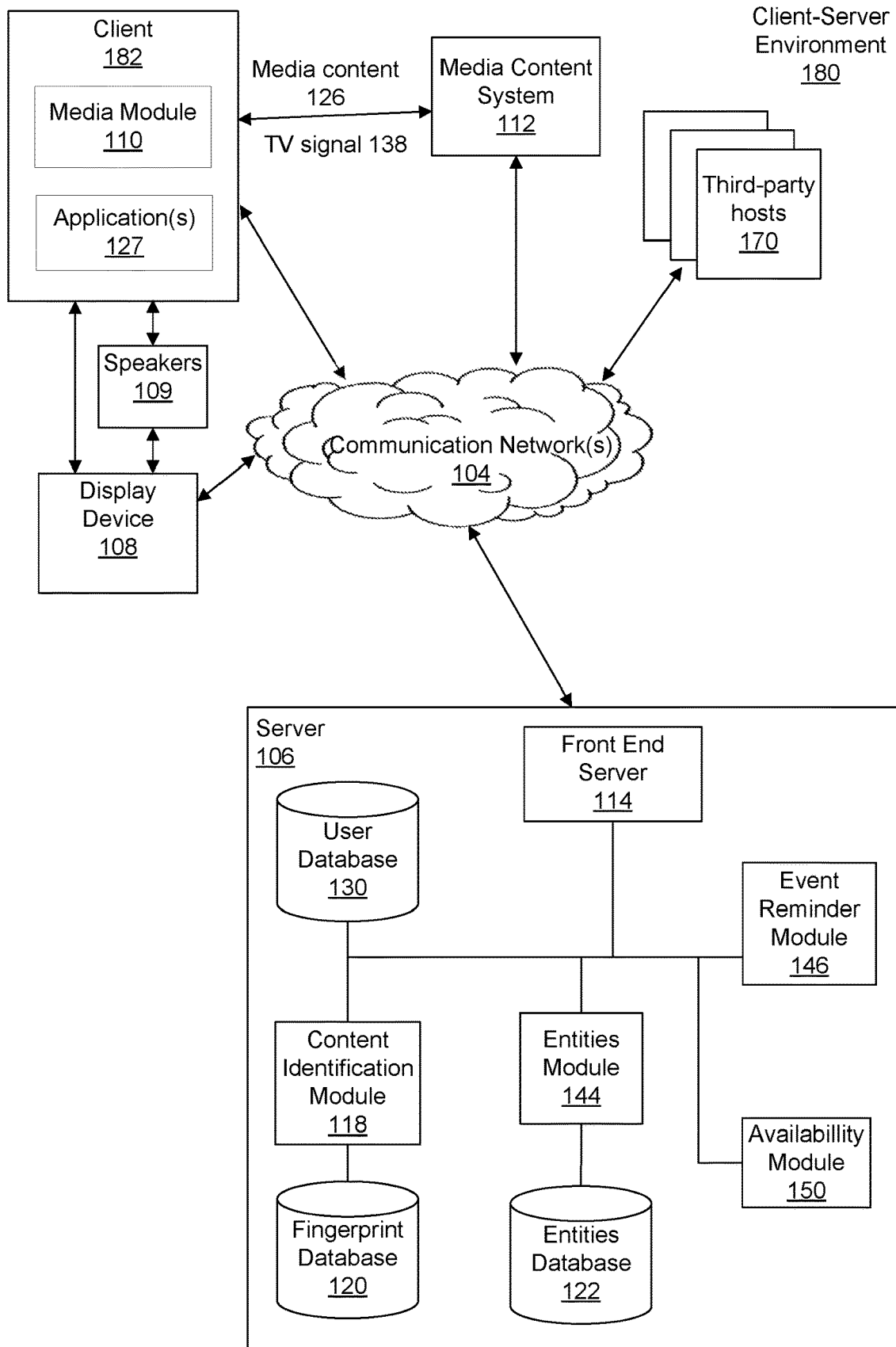

FIG. 1B depicts a distributed system 180 that is similar to the distributed system 100 depicted in FIG. 1A. In FIG. 1B, the features and components of client devices 102 and 140 (FIG. 1A) are subsumed into a client device 182. In the distributed system 180, the client device 182 device receives and presents the media content 126. The client device 182 sends the content information to the server 106. The server 106 identifies the media content and sends entity information to the client device 182 for presentation. In other aspects, the distributed system 180 is same as or similar to the distributed system 100. Thus, the details are not repeated here.

In some other embodiments, the features and components of client devices 102 and 140 (FIG. 1A) are included in a client device and a display-less secondary device. For example, continuing with the example illustrated in FIG. 1B, the client device 182 may be associated with a display-less secondary device (e.g., a remote control). The secondary device includes a microphone that performs capture of audio of media content playing at the client device 182 and capture of voice input commands from users. The secondary device performs the capture of media content audio and/or voice inputs from users, and sends the captured audio and/or voice inputs to the client device 182 for further processing. Thus, for example, a user may be streaming media content on the client device and the media content is displayed on display coupled to the client device. The user issues a request, which is captured by the secondary device. The secondary device sends the captured request to the client device for processing. The client device displays the response to the request on the coupled display device.

Figure 2:
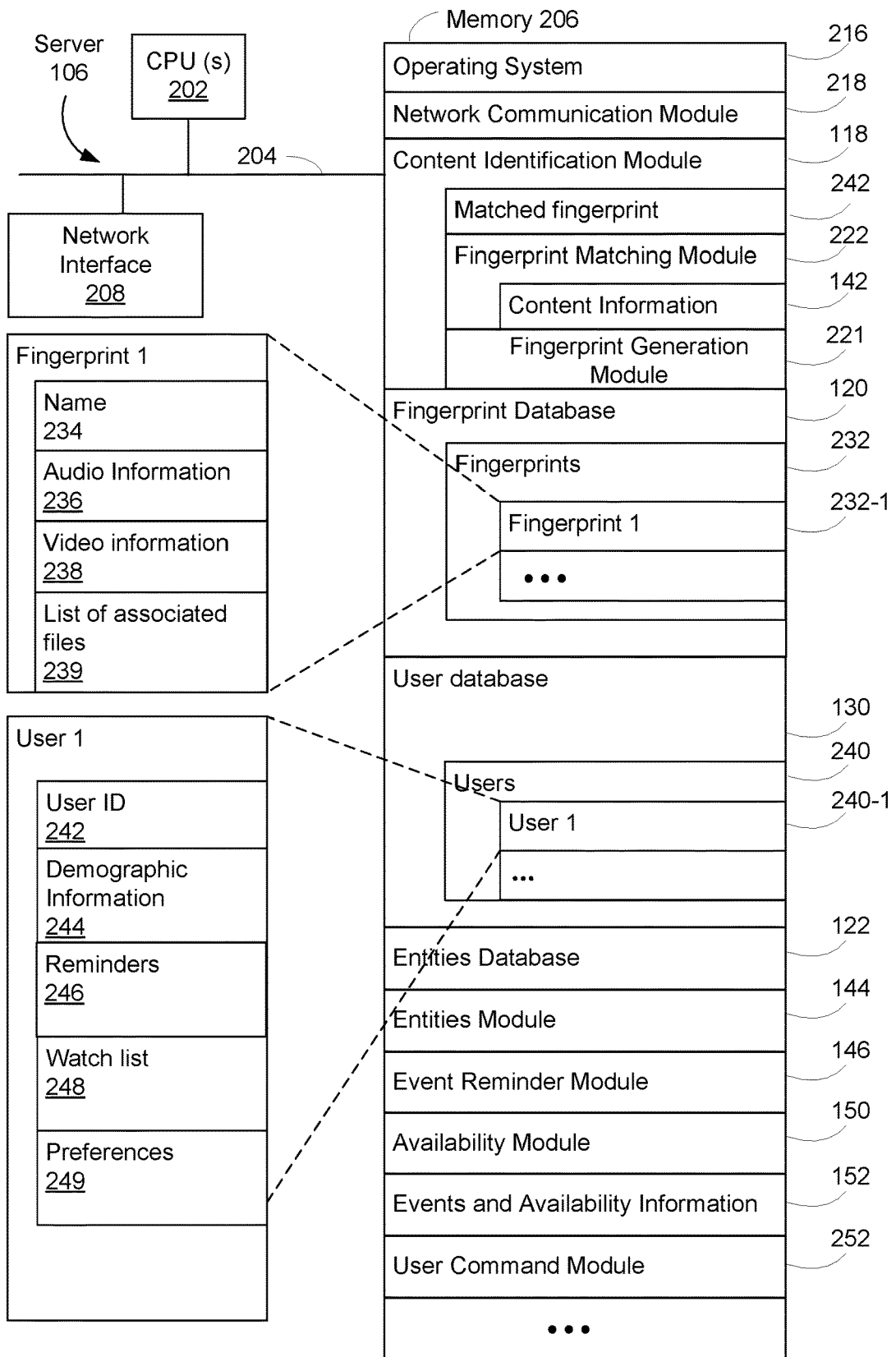
FIG. 2 is a block diagram illustrating the structure of an example server system according to some implementations.

FIG. 2 is a block diagram illustrating a server system 106, in accordance with some implementations. The server system 106 typically includes one or more processing units (CPU's) 202, one or more network or other communications interfaces 208, memory 206, and one or more communication buses 204 for interconnecting these components. The communication buses 204 optionally include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a non-transitory computer readable storage medium. In some implementations, memory 206 or the non-transitory computer readable storage medium of memory 206 stores the following programs, modules and data structures, or a subset thereof including an operation system 216, a network communication module 218, a content identification module 118, a fingerprint database 120, an entities database 122, a user database 130, an entities module 144, an event reminder module 146, availability module 150, events and availability information 152, and user command module 252.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the Internet, other wide area networks, local area networks, metropolitan area networks, and so on.

The fingerprint database 120 stores one or more content fingerprints 232. In some implementations, a fingerprint 232 (e.g., fingerprint 232-1) includes a name 234, fingerprint audio information 236 and/or fingerprint video information 238, and a list of associated files 239. The name 234 identifies the respective content fingerprint 232. For example, the name 234 can include the name of an associated television program, movie, or advertisement. In some implementations, the fingerprint audio information 236 includes a fingerprint or other compressed representation of a portion (such as several seconds, minutes, or hours) of the audio content of a video stream or an audio stream. In some implementations, the fingerprint video information 238 includes a fingerprint of a portion (such as several seconds, minutes, or hours) of a video stream. In some implementations, the fingerprint 232 includes a fingerprint or other representation of a portion of the subtitles data of a video stream. Fingerprints 232 in the fingerprint database 120 are periodically updated.

The user database 130 includes user data 240 for one or more users. In some implementations, user data 240 (e.g., user data 240-1) for a respective user includes a user identifier 242, demographic information 244, reminders 246, a watch list 248, and preferences 249. The user identifier 242 identifies a user. For example, the user identifier 242 can be an IP address associated with a client device 102 or an alphanumeric value chosen by the user or assigned by the server that uniquely identifies the user (e.g., a user account name, a user ID number). The demographic information 244 includes one or more characteristics of the respective user. The demographic information may include one or more of: age, gender, income, geographic location, education, wealth, religion, race, ethic group, marital status, household size, employment status, and political party affiliation. Reminders 246 are reminders of events set by the event remainder module 146 for the user. Watch list 248 is a list of media content (e.g., movies, television shows, etc.) the user wishes to watch in the future. Event reminder module 146 may set a reminder by adding an entry to the watch list 248. Preferences 249 are a user-specified set of entities (entity preferences) and/or events types (event preferences). The preferences 249 specify entities and or event types that the user is interested in and for which the user wants event reminders to be set automatically (e.g., without need for explicit user confirmation). For example, the preferences 249 may specify a particular television series and event types including showings of new episodes on television and availability for digital streaming. When new episode showings for the particular television series are identified by the server 106, reminders for those showings may be set automatically without need to explicitly ask the user for confirmation. In some implementations, preferences 249 also include location preferences of the user (e.g., one or more geographical regions the user prefers with respect to events, so that the server 106 can focus its identification of events to events in regions preferred by the user) and/or preferences regarding the mode of the reminder (e.g., whether the reminder should be a calendar entry, a notification, which device the notification should appear in, etc.).

In some implementations, the user data 240 for a respective user also includes one or more of: a calendar, a tasks list, a search history (e.g., search queries the user has submitted to search engines), a content browsing history (e.g., web pages viewed by the user), and a content consumption history (e.g., videos the user has viewed).

The content identification module 118 receives content information from the client device 102 or 140, and identifies the media content being presented at the client device 102 or 140. The content identification module 118 includes a fingerprint matching module 222. In some implementations, the content identification module 118 also includes a fingerprint generation module 221, which generates fingerprints from the content information or other media content saved by the server. In some implementations, the content identification module 118 identifies the media content based on information other than, or in addition to, the fingerprint. For example, the content identification module 118 may use information obtained from inaudible tones, optical character recognition (OCR) of on-screen text, subtitles data, transmissions of information from the client device 102 by Bluetooth, etc. to identify the media content. In some implementations, the client device 102/140 includes information obtained from obtained from inaudible tones, optical scan recognition of on-screen text, subtitles data, transmissions of information from the client device 102 by Bluetooth, etc. in the content information sent to the sever 106.

The fingerprint matching module 222 matches at least a portion of the content information (or a fingerprint of the content information generated by the fingerprint generation module) to a fingerprint 232 in the fingerprint database 120. The matched fingerprint 242 is sent to the entities module 144, which retrieves entities associated with the matched fingerprint 242 from the entities database 122. The matched fingerprint 242 includes content information received from the client device 102. In some implementations, the content information includes audio information, video information, a user identifier, and optionally subtitles data. The user identifier in the content information identifies a user associated with the client device 102 or 140 from which the content information is sent. For example, the user identifier can be an IP address associated with a client device 102, or an alphanumeric value chosen by the user or assigned by the server that uniquely identifies the user. In some implementations, the audio information includes a clip (such as several seconds, minutes, or hours) of a video stream or audio stream that was played on the client device 102. In some implementations, the video information includes a clip (such as several seconds, minutes, or hours) of a video stream that was played on the client device 102.

The entities database 122 includes entities associated with media content. The entities database 122 is further described below, with reference to FIG. 4.

The entities module 144 identifies, and selects or retrieves, entities from the entities database 122 that are associated with a media content item and optionally a position within the media content item, based on the matched fingerprint 242 or other criteria. The selected/retrieved entities may be a subset of the entities referenced in the matched fingerprint 242 (e.g., the entities module 144 selects an entity that is referenced in the matched fingerprint 242).

The event reminder module 146 sets reminders 246 for users. The reminder module 146 identifies events associated with entities and, in accordance with a user command or request, creates and sets a reminder for an event associated with an entity mentioned in media content item 126 playing at the client 102. In some implementations, the entity associated with the event is mentioned or referenced in the media content item 126 proximate to the playback time when the user command or request is made by the user or received by the server 106. In some implementations, a separate module identifies events associated with entities, and the event reminder module 146 sets reminders in accordance with users requests.

The availability module 150 crawls third party hosts 170 and media content system 112 for information on availability of events.

In some implementations, the identified events and event availability information are stored as events and availability information 152 in the memory 206 (e.g., in the entities database 122 as temporal information associated with entities or in a separate database). Events and availability information includes, for example, when a movie opens in theaters, television listings and program guides, events schedules and calendars, when a particular media content title is available for access (e.g., purchase, rental, free ad-supported access) in physical media or digital download or streaming, and so on.

The user command module 252 processes the user command or request (e.g., verbal command/request) received from the client device 140/102 to determine what the request is and if the request includes any parameters. In some implementations, the user command module 252 includes a voice processing module for processing verbal commands and requests (e.g., transcription, speech-to-text conversion, natural language processing, keyword identification, text parsing, etc.). In some implementations, the processing includes determining from the command/request for what kind of entity and event the user is requesting a reminder, e.g., determining if the command/request includes any limiting parameters that may be used to narrow the possible entities and events for which the user is requesting a reminder (e.g., if the request includes an entity type, if the request includes an event type, if the request includes a date range for the event, if the request includes a sex of a person entity, etc.).

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., content identification module 118) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2 shows a server system, FIG. 2 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 216 and network communication module 218) shown separately in FIG. 2 could be implemented on single servers and single items could be implemented by one or more servers. The actual number of servers used to implement the server system 106 and how features are allocated among them will vary from one implementation to another, and may depend in part on the amount of data traffic that the system must handle during peak usage periods as well as during average usage periods.

Figure 3A:
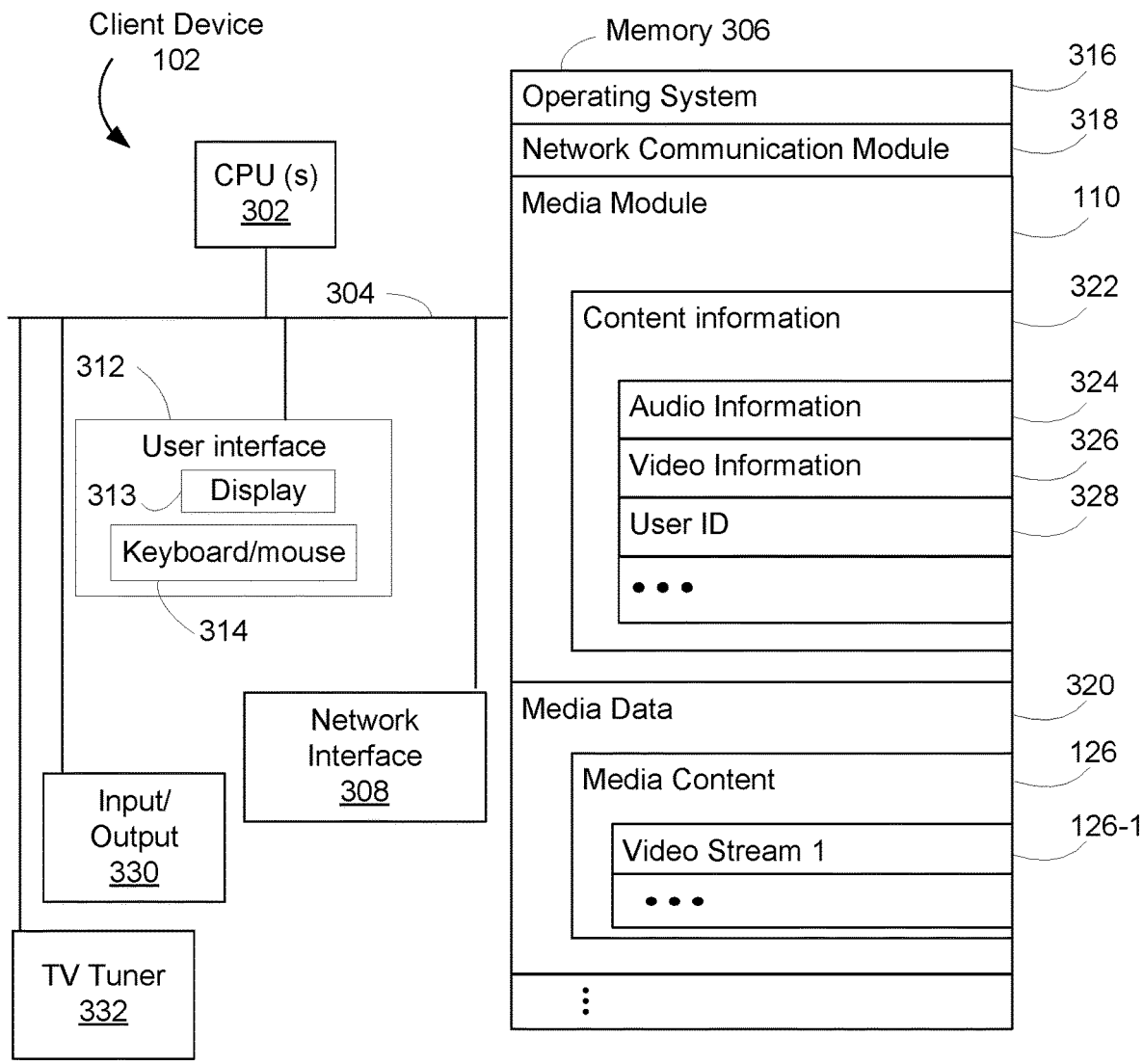
FIG. 3A is a block diagram illustrating the structure of an example client device according to some implementations.
Figure 3B:
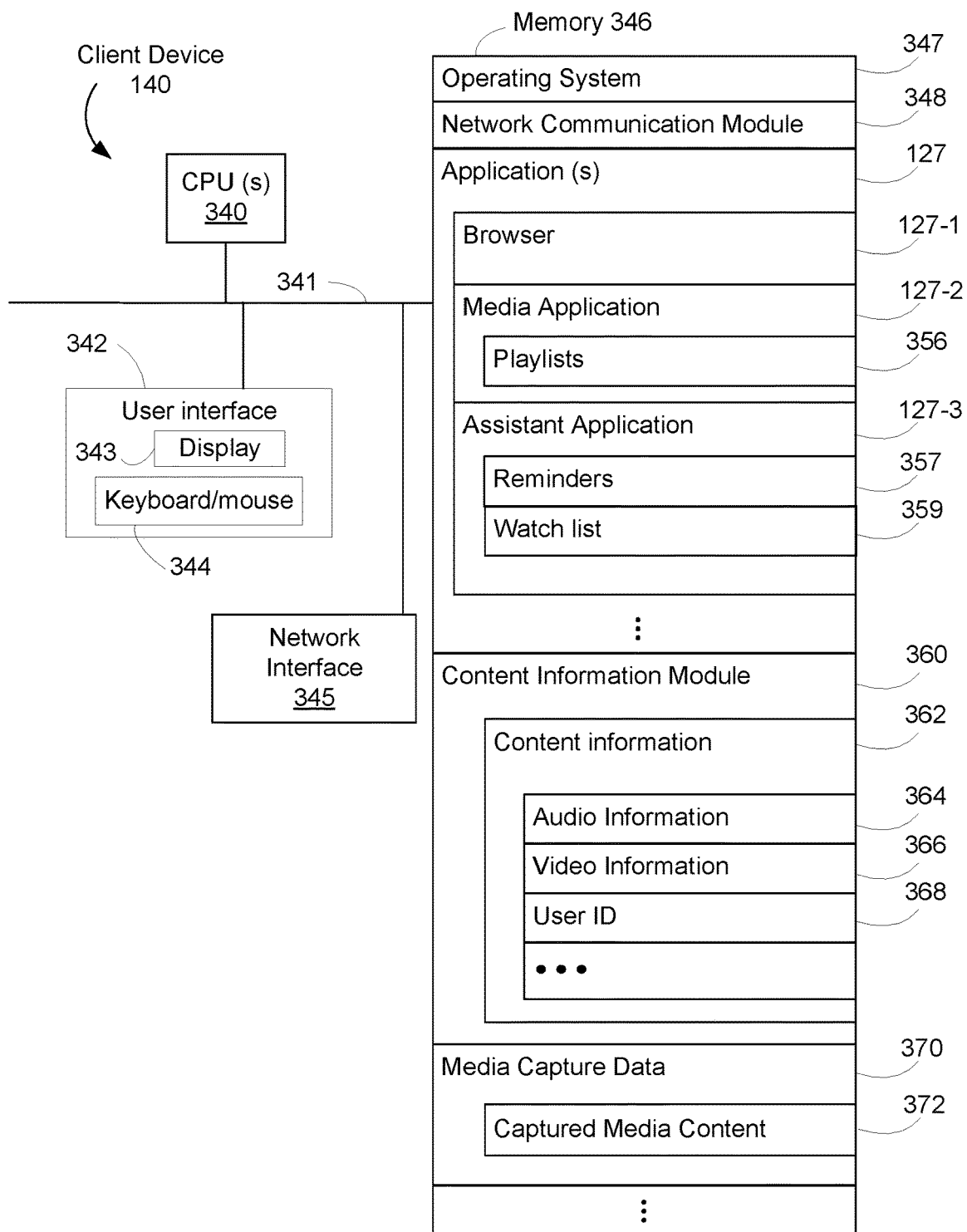
FIG. 3B is a block diagram illustrating the structure of an example client device according to some implementations.

FIG. 3A is a block diagram illustrating a client device 102, in accordance with some implementations. The client device 102 typically includes one or more processing units (CPU's) 302, one or more network or other communications interfaces 308, memory 306, and one or more communication buses 304, for interconnecting these components. The communication buses 304 optionally include circuitry (sometimes called a chipset) that interconnects and controls communications between system components. The client device 102 may also include a user interface comprising a display device 313 and a keyboard and/or mouse (or other pointing device) 314. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a non-transitory computer readable storage medium. In some implementations, memory 306 or the computer readable storage medium of memory 306 store the following programs, modules and data structures, or a subset thereof including operation system 316, network communication module 318, a media module 110 and media data 320.

In some implementations, the client device 102 includes an input/output 330 for receiving and outputting media content streams or data. In some implementations, the input/output 330 is configured to receive media content streams from radio transmissions, satellite transmissions, and cable lines. In some implementations the input/output 330 is connected to a set top box. In some implementations, the input/output 330 is connected to a satellite dish. In some implementations, the input/output 330 is connected to an antenna. In some implementations, the client device 102 receives the media content stream through the network interface 308 (e.g., receiving a video stream through the Internet), as opposed to through the input/output 330.

In some implementations, the client device 102 includes a television tuner 332 for receiving and processing video streams or TV signals.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the Internet, other wide area networks, local area networks, metropolitan area networks, and so on.

The data 320 includes media content 126. The media content 126 may include, for example, a video stream 126-1, an audio stream, a video file, and/or an audio file. In some implementations, the media content 126 is received from a media content system 112.

The media module 110 derives content information 322 from media content 126. In some implementations, the content information 322 includes audio information 324, video information 326, a user identifier 328, information from inaudible tones, information from OCR of on-screen text, etc. or any combination thereof. The user identifier 328 identifies a user of the client device 102. For example, the user identifier 328 can be an IP address associated with a client device 102 or an alphanumeric value chosen by the user or assigned by the server that uniquely identifies the user. In some implementations, the audio information 324 includes a portion (such as several seconds, minutes, or hours) of media content 126 (e.g., a video stream, an audio stream). In some implementations, the video information 326 includes a portion (such as several seconds, minutes, or hours) of media content 126. In some implementations, the content information 322 includes subtitles data corresponding to the media content 126. In some implementations, the video information 326 and audio information 324 are derived from media content 126 that is playing or was played on the client device 102. The media module 110 may generate several sets of content information for respective media content 126.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3A shows a client device, FIG. 3A is intended more as functional description of the various features which may be present in a client device than as a structural schematic of the implementations described herein. In practice, and as recognized by those of ordinary skill in the art, items shown separately could be combined and some items could be separated.

FIG. 3B is a block diagram illustrating a client device 140, in accordance with some implementations. The client device 140 typically includes one or more processing units (CPU's) 340, one or more network or other communications interfaces 345, memory 346, and one or more communication buses 341, for interconnecting these components. The communication buses 341 optionally include circuitry (sometimes called a chipset) that interconnects and controls communications between system components. The client device 140 may also include a user interface comprising a display device 343 and a keyboard and/or mouse (or other pointing device) 344. Memory 346 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 346 may optionally include one or more storage devices remotely located from the CPU(s) 340. Memory 346, or alternatively the non-volatile memory device(s) within memory 346, comprises a non-transitory computer readable storage medium. In some implementations, memory 346 or the computer readable storage medium of memory 346 store the following programs, modules and data structures, or a subset thereof including operation system 347, network communication module 348, graphics module 349, applications 127, content information module 360, and media capture data 370.

The operating system 347 includes procedures for handling various basic system services and for performing hardware dependent tasks.

The network communication module 348 facilitates communication with other devices via the one or more communication network interfaces 345 (wired or wireless) and one or more communication networks, such as the Internet, other wide area networks, local area networks, metropolitan area networks, and so on.

The client device 140 includes one or more applications 127. In some implementations, the applications 127 include a browser application 127-1 (e.g., a web browser application), a media application 127-2, and an assistant application 127-3. The browser application 127-1 renders and displays, for example, web pages. The media application 127-2 performs one or more of the following operations: plays media content (e.g., video and audio), displays images, and manages playlists 356. The assistant application 127-3 (which may also be referred to as an "intelligent personal assistant" application) displays information that is relevant to the user (e.g., event reminders 357, entries in the watch list 359, upcoming appointments, traffic on a route to be travelled) and perform tasks or services relevant to the user or requested by the user (e.g., sending alerts to notify friends of tardiness to an appointment, schedule updating, calling a phone number). The applications 127 are not limited to the applications discussed above.

Reminders 357 and watch list 359 are the reminders and watch list for the user of the client device 140. Reminders 357 and watch list 359 are retrieved from reminders 246 and watch list 248, respectively, stored in the user database 130 and received from the server 106.

Each of the above identified elements may be stored in one or more of the previously mentioned memory devices, and each of the modules or programs corresponds to a set of instructions for performing a function described above. The set of instructions can be executed by one or more processors (e.g., the CPUs 340). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3B shows a client device, FIG. 3B is intended more as functional description of the various features which may be present in a client device than as a structural schematic of the implementations described herein. In practice, and as recognized by those of ordinary skill in the art, items shown separately could be combined and some items could be separated.

Figure 4:
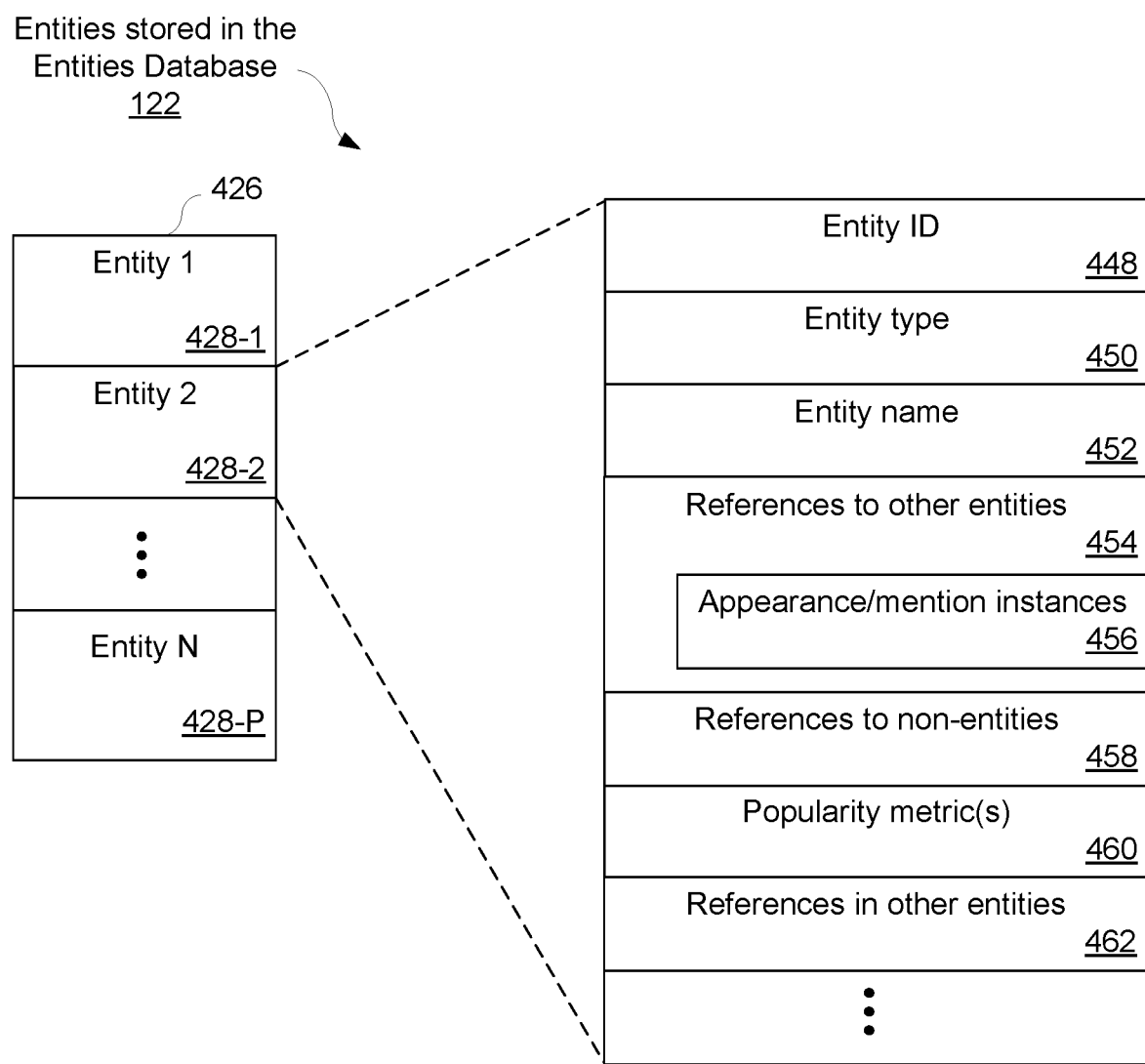
FIG. 4 illustrates an example entity data structure according to some implementations.

FIG. 4 illustrates an entities data structure 426 stored in the entities database 122, according to some implementations. A respective entity 428 includes an entity identifier (entity ID) 448, entity type 450, entity name 452, references to other entities 454, references to non-entities 458, (optionally) popularity metrics 460, references in other entities 462, and additional information. In some implementations, the entity ID 448 uniquely identifies a respective entity 428. The entity type 450 identifies the type of the entity 428. For example, the entity type 450 for a respective entity 428 in the entities database 122 indicates that the respective entity 428 is a title, event, media content, person, place, etc. In some implementations, the entity type 450 also indicates multiple types and/or sub-types (e.g., an entity is media content and a title (of the media content); media content is a movie or television show). The entity name 452 names the entity. For example, the entity name, depending on the entity, is the title of the movie or television show, person name, place name, song or composition name, name of a thing, a product name, the actual words of a quotation, or the award name. References to other entities 454 indicate references to other entities 428 (e.g., by their entity IDs 448). For example, an entity 428 corresponding to a movie title includes references 454 to the movie's cast members, crew members, characters, places, and so on. When appropriate, the references to other entities include information on instances 456 when the other entities appear or are mentioned. For example, the instances 456 data for a movie title entity include time ranges for when a cast member or a character appears, or when a product or another movie is mentioned, and so on. In some implementations, the instances 456 also include instances in which the entity 428 is mentioned or referenced in other entities (e.g., the entity 428 is mentioned in another movie or television show). In some implementations, the references/mentions in other entities are stored separately as references in other entities 462. References to non-entities 458 include references to content not stored as entities in the entities database 122 that are nevertheless related to the entity 428 (e.g., links to web pages mentioning the entity). The popularity metrics 460 provide a measure of the importance of an entity file 428. In some implementations, the metrics 460 are determined by the server 106. In some implementations, the popularity metrics include both historical and real-time popularity. In some implementations, information on events and event availability (e.g., dates, times, and locations, etc.) is stored in the entities data structure 426, for example as data for a respective entity 428 in addition to the data described above.

Figure 5:
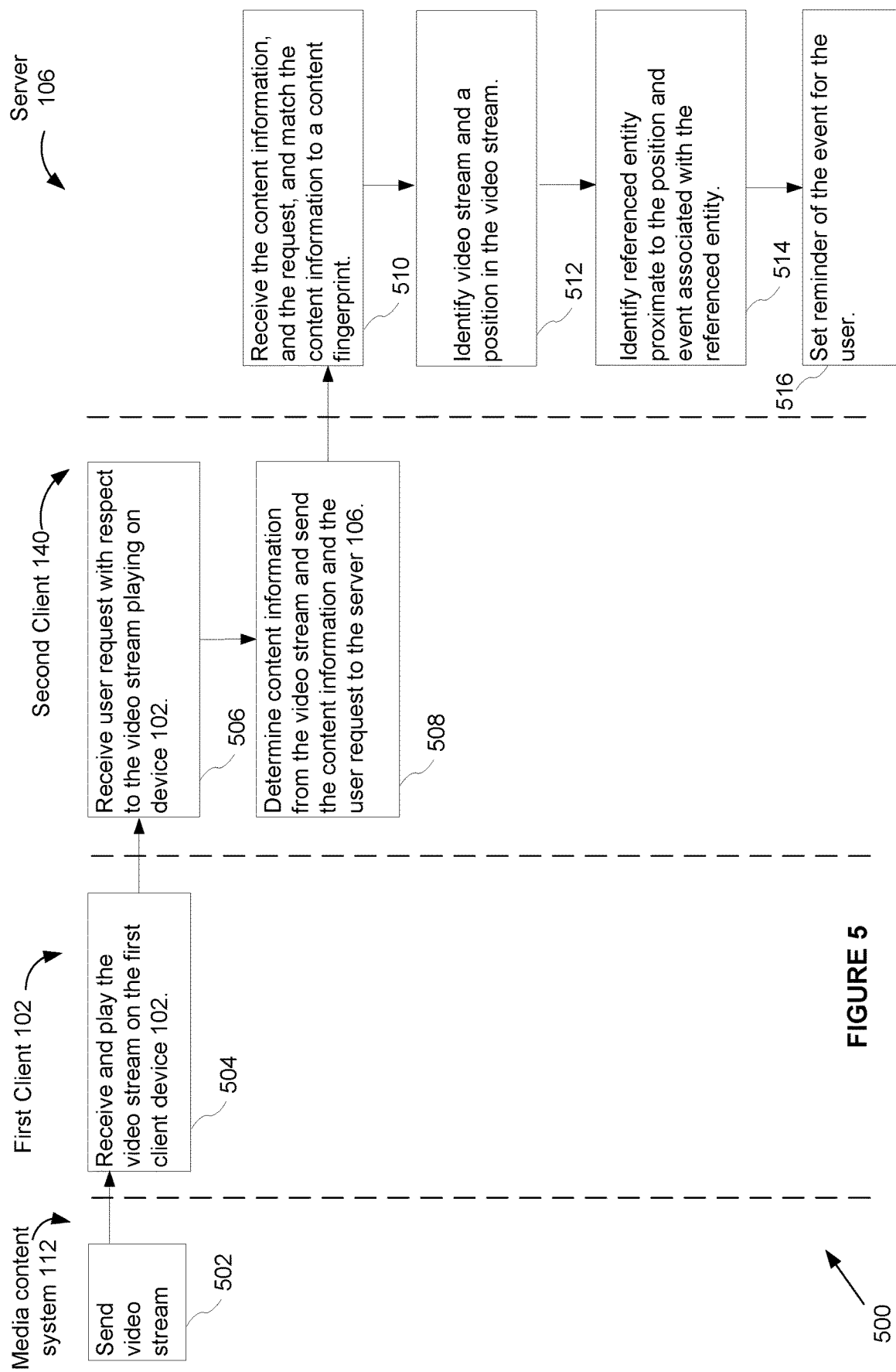
FIG. 5 is a flowchart illustrating a process of setting a reminder for an event associated with an entity referenced in media content, in accordance with some implementations.

FIG. 5 is a flowchart illustrating a process 500 of setting a reminder for an event associated with an entity referenced in media content, in accordance with some implementations. FIG. 5 provides an overall view of a method of setting a reminder for an event associated with an entity referenced in media content, which is discussed in more detail in the discussion of FIGS. 7A-7C.

A media content system 112 sends a video stream (or, more generally, a media content item) to a client device 102

(502). The video stream is received and played (and displayed) by the client device 102 (504). While the video stream is played, a user request with respect to the playing video stream is received at client device 140 (506). In some implementations, the user request is made by the user verbally; the user utters the request using one or more words and phrases, which is captured by the client device 140. The client device 140 determines or generates content information from the video stream, and sends the content information and the user request to the server 106 (508). In some implementations, for a verbal user request, the client device 140 performs a transcription or speech-to-text conversion of the verbal request, and sends the resulting transcription or conversion text to the server 106. In some other implementations, the client device 140 sends the captured audio of the verbal user request to the server 106; the transcription or speech-to-text conversion of the verbal request is performed at the server 106 (e.g., by the user command module 252).

In some implementations, while the video stream is played, the client device 140 captures audio output, from the client device 102, corresponding to the audio component of the video stream (e.g., a microphone on the client device 140 picks up the audio output from the client device 102), and determines the content information from the captured audio output. The client device 140 determines the content information and sends the content information to the server 106.

In some implementations, the content information from the video stream includes one or more clips or portions (e.g., several seconds, minutes, or hours) of audio and/or video components of the video stream or the corresponding subtitles data, or fingerprints or other signatures generated by the client device playing the video stream from one or more clips or portions of the audio and/or video components of the video stream and/or the corresponding subtitles data. In some implementations, the content information is formatted so it can be readily compared to content fingerprints stored on the server.

The server 106 receives the content information and request, and matches the content information to a content fingerprint (510). In some implementations, the server 106 (e.g., the user command module 252) processes the user request.

In some implementations, the content fingerprints are generated by the server (e.g., using the fingerprint generation module 221), prior to run time, from media content (e.g., audio and/or video clips, or video frames) uploaded by a third party. In some implementations, the content fingerprints are generated by the server (e.g., using the fingerprint generation module 221), in real-time (e.g., live) or prior to run time, from media content (e.g., audio and/or video clips, or video frames) received from the media content system 112.

The server 106 identifies the video stream and a position in the video stream (512). The server 106 identifies the particular movie, particular television show and episode, etc. in the video stream, and identifies a playback position (e.g., how many minutes and seconds into the movie or episode) in the video stream. In some implementations, the server 106 uses the content information to identify the video stream and position. In some implementations, the identified playback position is a playback position that is playing at about the same time (e.g., within a predefined time period from) as when the user request is made or received. For example, if the user request is made or received when playback of a movie in the video stream is at about 1 hour 10 minutes into the movie, the identified position is about 1 hour 10 minutes in the movie.

The server 106 identifies an entity referenced or mentioned in the video stream, where the reference or mention is proximate to the identified position, and identifies an event associated with the referenced entity (514). The server 106, based on the identified position in the video stream, identifies one or more entities referenced or mentioned proximate to (e.g., at about, within a predefined time range before or after) the identified position. Based on the identified entity or entities, the server 106 identifies an event that are associated with the identified entities (e.g., movie openings in theaters, a movie release on a particular platform, broadcast times of a television episode, live event involving the entity, etc.). In some implementations, the server 106 identifies multiple entities and sends a prompt to the client device 140, where the prompt asks the user to select an entity from the identified multiple entities, where the server 106 then identifies one or more events associated with the selected entity. In some implementations, the server 106 identifies multiple events and sends a prompt to the client device 140, where the prompt asks the user to select an event from the identified multiple events.

In some embodiments, the server 106 identifies the referenced or mentioned entity using subtitles data proximate to the identified position. For example, text in the subtitles data proximate to the identified position may be matched to the entities database 122 or other databases or information sources to identify the entity. In some other embodiments, the server 106 may use other data in addition to or instead of subtitles data to identify the referenced or mentioned entity. For example, the client device may perform optical character recognition (OCR) of on-screen text proximate to the identified position and send the OCR text to the server 106, which uses the OCR text to identify the referenced/ mentioned entity. Other methods for identifying the referenced or mentioned entity include matching lyrics proximate to the identified position to a lyrics database to identify the song being sung (and from that, for example, identify the artist), matching music proximate to the identified position to a music database to identify the music being played (and from that, for example, identify the artist), matching text in subtitles data proximate to the identified position to a news stories database or repository to identify an referenced entity associated with a news story, and/or matching an advertisement (e.g., an advertisement video being played proximate to the identified position) to an advertisements database to identify the advertisement currently playing (and from that, for example, identify the product and/or the company).

The server 106 sets a reminder of the event of the user (516). The server 106 creates an event reminder to remind the user of the event. The reminder may be an entry in a watch list, calendar entry with a corresponding notification, a reminder in a task list, and so on. In some implementations, the user is given an opportunity to select a mode of the reminder. For example, before the reminder is set, the server 106 sends to the client device 102/140, for display to the user, a prompt to specify or select a mode of the reminder (e.g., calendar entry, text message, scheduled DVR recording, etc.), to accept a mode selected by the server 106, and/or to select a different mode than one selected by the server 106. In some other implementations, the mode of the reminder is determined from the user's preferences 249 without prompting for user intervention or confirmation.

In some implementations, the server 106, before setting the reminder (e.g., after identifying one or more entities, after identifying one or more events), generates a presentation and sends that presentation to the client device 140, where the presentation is displayed to the user. The presentation prompts the user to confirm the identified entity and identified event for which a reminder is to set. If the user confirms the entity and event, the server 106 sets the reminder. If the user does not confirm, the server 106 forgoes setting the reminder. In some implementations, if the entity and/or the event type meet the user's preferences 249, the server 106 may skip the confirmation prompt and set the reminder without asking the user for confirmation.

It should be appreciated that the event for which the reminder is set, and the associated entity mentioned/referenced in the media content item 126, is not necessarily related, and typically is not related, to the media content item 126 other than that the entity and/or the event is mentioned/referenced in the media content item 126 (e.g. mentioned in the spoken dialogue in the media content item 126). For example, in a media content item 126 of a comedian performing a comedy routine, that a movie is mentioned in one of the jokes in the comedy routine does not necessarily indicate, imply, or suggest a relationship between the movie and the media content item 126 beyond the mention itself.

FIGS. 6A-6D illustrate example user interfaces in accordance with some implementations. It should be appreciated that the user interfaces illustrated in FIGS. 6A-6D, and variations are possible.

Figure 6B:
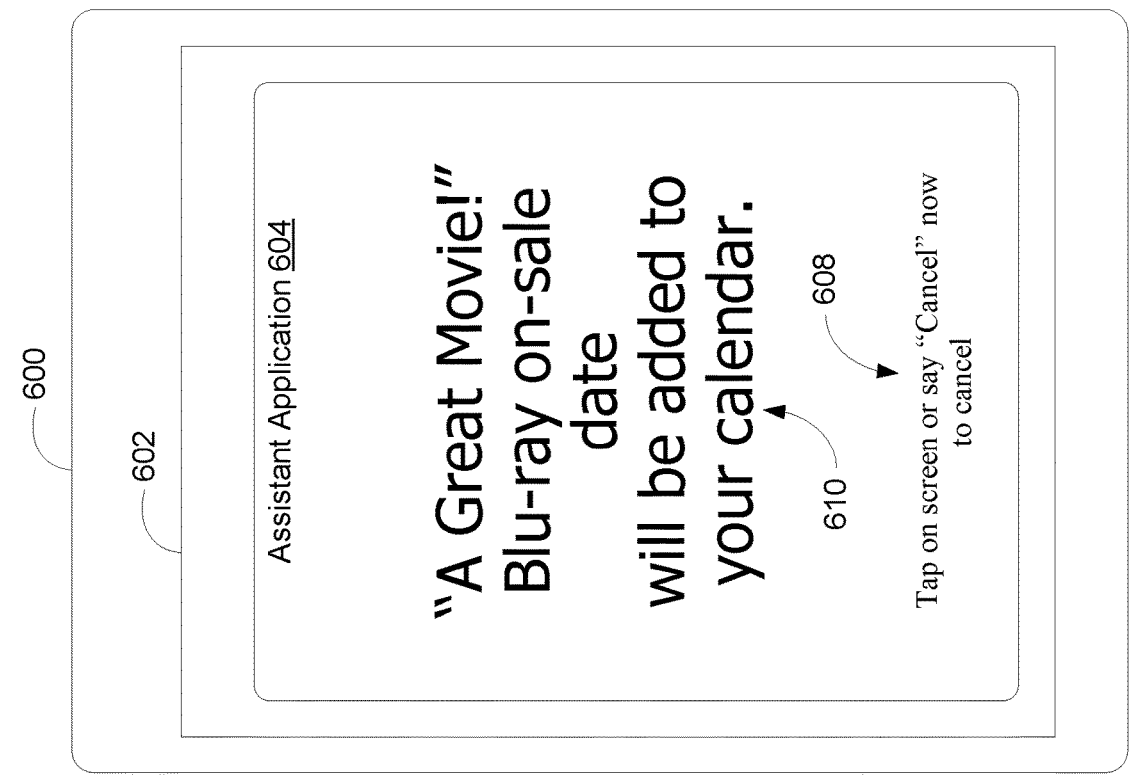
FIGS. 6A-6D are example user interfaces in accordance with some implementations.
Figure 6A:
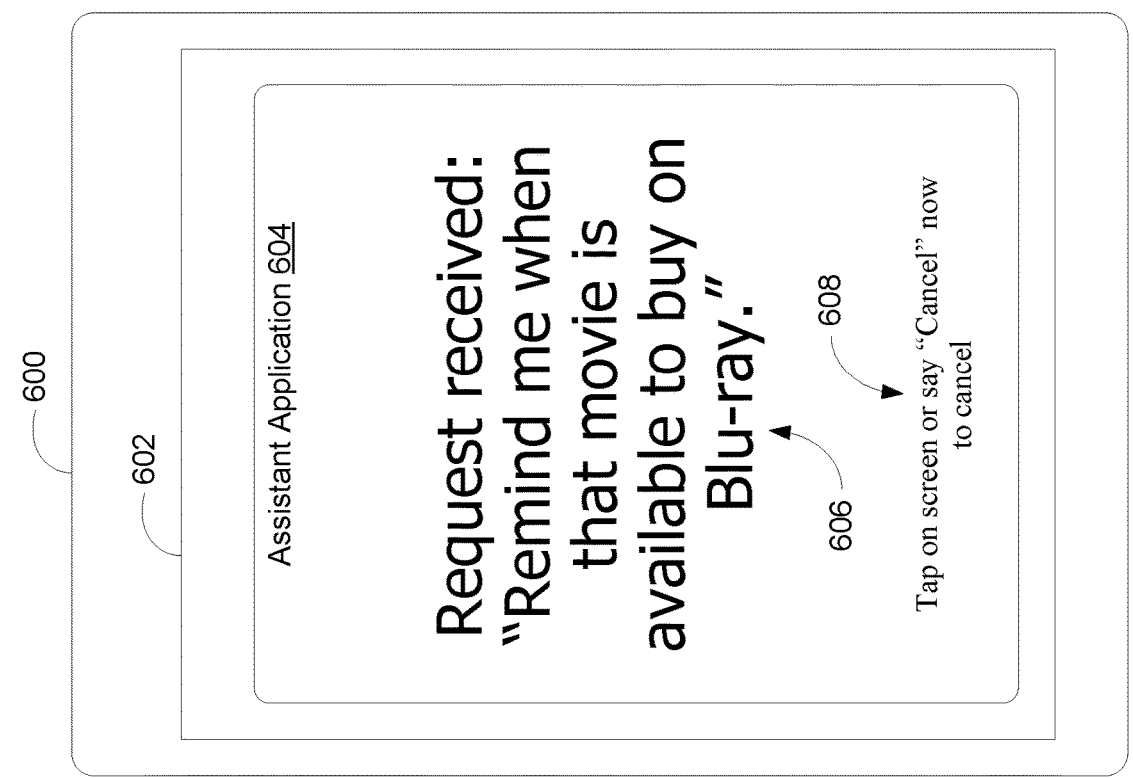

FIG. 6A illustrates a client device 600 (e.g., client device 140, FIG. 3B) with a display 602 (e.g., display 343). Within the display 602 is displayed a user interface 604 for an assistant application (e.g., assistant application 127-3). As a user of the client device 600 is watching or listening to media content being played on a device (e.g., on client device 102), the assistant application 604, when running and active, can capture audio output from the playing media content and receive requests to set reminders for events associated with entities referenced in the media content.

In FIG. 6A, a user has uttered the request "remind me when that movie is available to buy on Blu-ray," referencing a movie title the user had just heard being mentioned in the playing media content. In FIG. 6A, the user is requesting a reminder for when the movie the user just heard mentioned will be available for purchase on Blu-ray disk. The assistant application presents, in the user interface 604, a prompt 606 repeating the request as received and instructions 608 indicating actions to take if the user wishes to cancel the request (e.g., because the request as received is wrong, because the user is no longer interested, etc.). If the user wishes to cancel the request as repeated in the prompt 606, the user takes the actions indicated in the instructions 608. Otherwise, the request is carried out by the assistant application and the server 106.

In accordance with the user not cancelling the request, the assistant application generates content information from audio captured from the audio of the playing media content and sends the content information to the server 106, along with the request, so that the playing media content and the mentioned movie, are identified. The server 106 identifies the playing media content and the position in the media content when the request was received. With the playing media content and the position identified, the server 106 can then identify the entities (e.g., movie titles) mentioned around that position based on, for example, subtitles data for the playing media content. In some implementations, when the request includes a particular entity type and/or event type, as is the case here since the request specifically mentions "that movie" and Blu-ray purchase availability, the server 106 focuses its entity identification and/or event identification to entities of the mentioned event type and/or events of the mentioned event type. This may help the server 106 refine its identification as it can more readily exclude entities and events that are not of the mentioned type(s). The server 106 identifies a movie mentioned around the position as "A Great Movie!." In accordance with the identified entity and the requested event (Blu-ray release date), the server 106 identifies the date when "A Great Movie!" is released for purchase on Blu-ray. In some implementations, dates for the same event vary by region or location (e.g., when a movie becomes available for purchase on physical media), and the server 106 identifies events in one or more locations associated with the user (e.g., a location associated with the user in user data 240, such as a home location in the user's profile; a location specified in preferences 249; etc.).

Turning to FIG. 6B, before the server 106 sets the reminder, a prompt 610 is displayed in the assistant application user interface 604 showing the movie and event for which the reminder (e.g., calendar entry added to the user's calendar) is to be set, so that the user can confirm that those are correct. Instructions 608 are also displayed. If the user wishes to cancel the reminder, the user may perform an action indicated in the instructions 608. Otherwise, the reminder as indicated in the prompt 610 will be set. In some implementations, the prompt 610 includes the mode of the reminder (e.g., " . . . date will be added to your calendar" implies that the mode is a calendar entry; this mode is selected by the server 106).

Figure 6D:
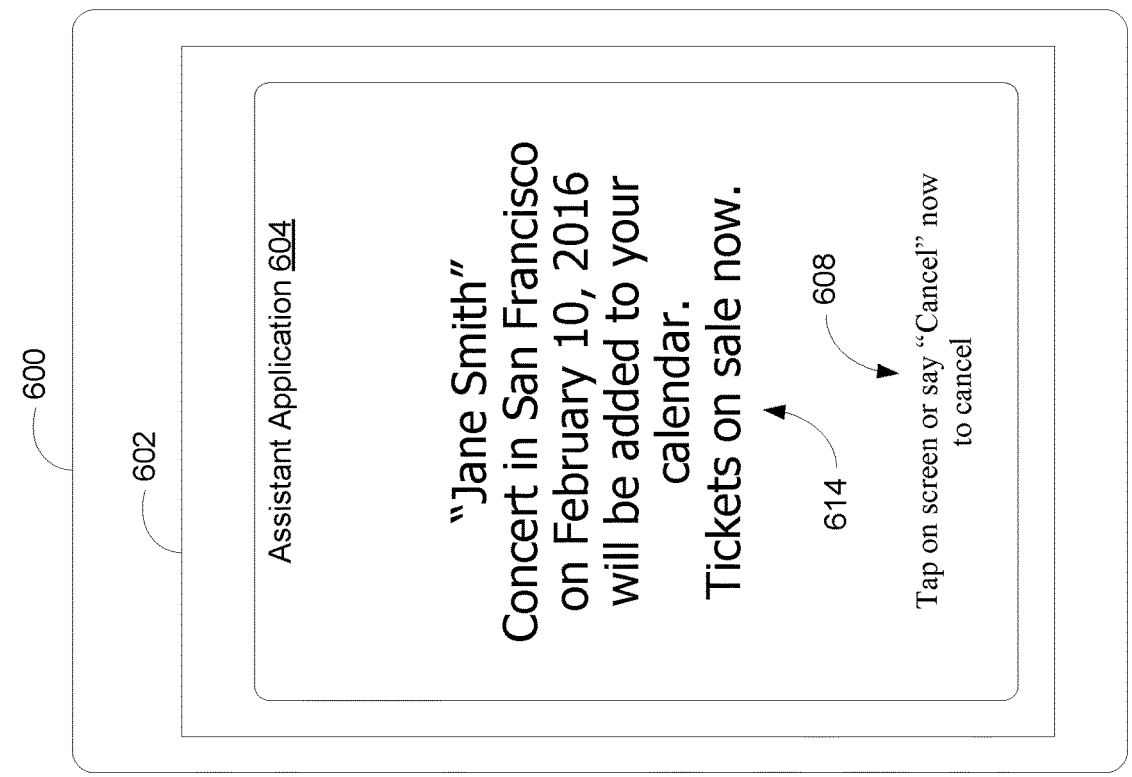
Figure 6C:
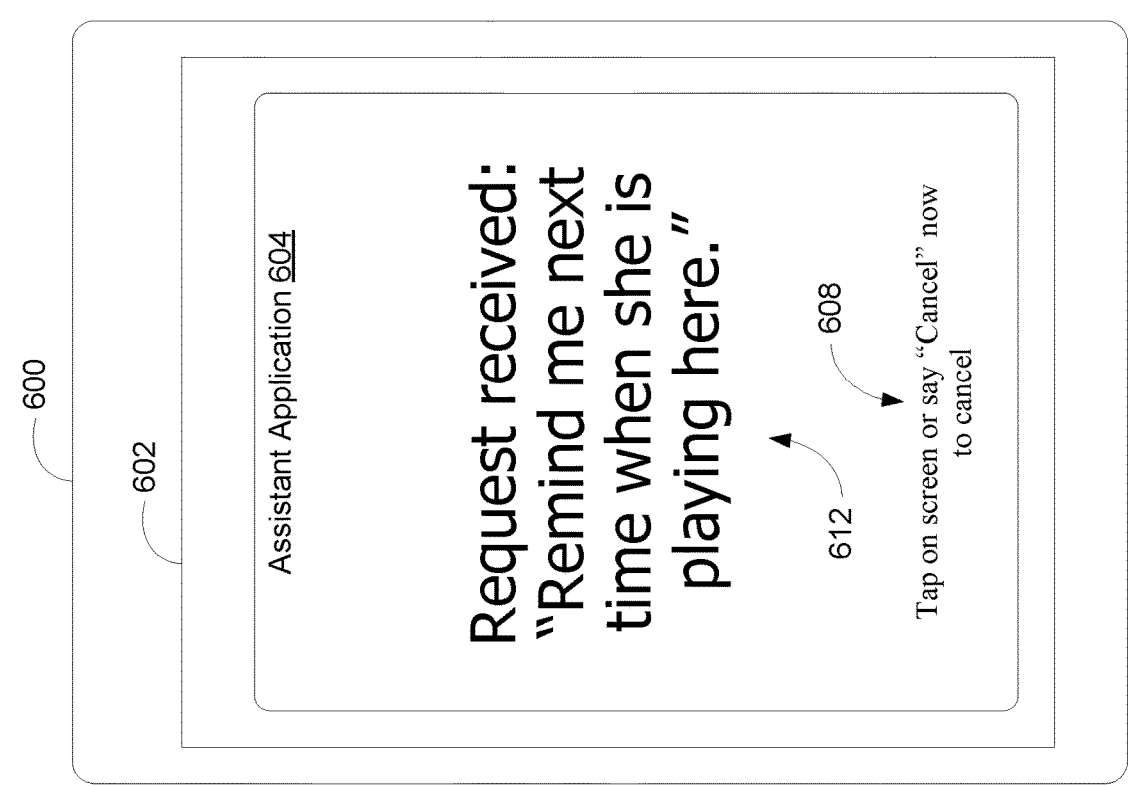

FIG. 6C illustrates another example of a prompt displayed to the user in response to receipt of a request from the user while the user is watching or listening to media content. The prompt 612 repeats the request "remind me next time when she is playing here." With the mention of "she," the server 106 knows that the entity the user heard mentioned is a female person. Also, "is playing here" suggests a live event. After identifying the media content and the position in the media content, the server 106 identifies the entity as musician Jane Smith and the event as a concert, in which Jane Smith is playing, in San Francisco on Feb. 10, 2016. FIG. 6D illustrates prompt 614 displayed to the user to confirm the entity (Jane Smith) and event (Feb. 10, 2016 concert in San Francisco) for the reminder. The server 106 was also able to determine that tickets for the concert are on sale and available, and that is also indicated in the prompt 614 ("Tickets on sale now.") Again, the user can cancel the reminder by performing an action indicated in instructions 608. Otherwise, the reminder as indicated in the prompt 614 will be set. In some implementations, the prompt 614 includes the mode of the reminder (e.g., "Concert . . . on Feb. 10, 2016 will be added to your calendar" implies that the mode is a calendar entry; this mode is selected by the server 106).

In some implementations, the prompt (e.g., prompt 610 or 614) prompts the user to confirm the event, date, and mode of the reminder selected by the server 106 and presented in the prompt, and to specify a different event, date, and/or mode if desired.

Figure 7A:
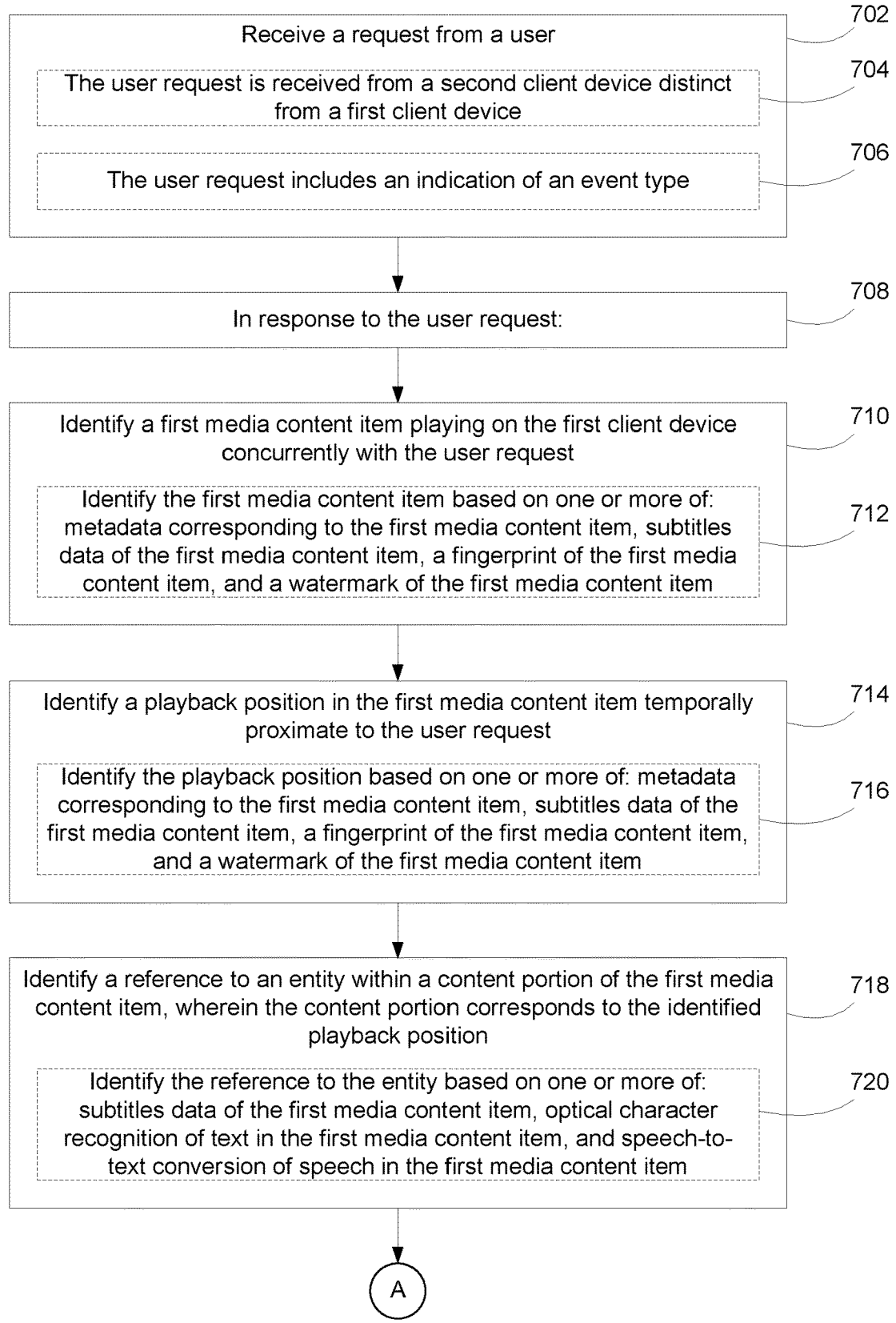
FIGS. 7A-7C illustrate a flowchart for a method for setting a reminder for an event associated with an entity referenced in media content, in accordance with some implementations.
Figure 7B:
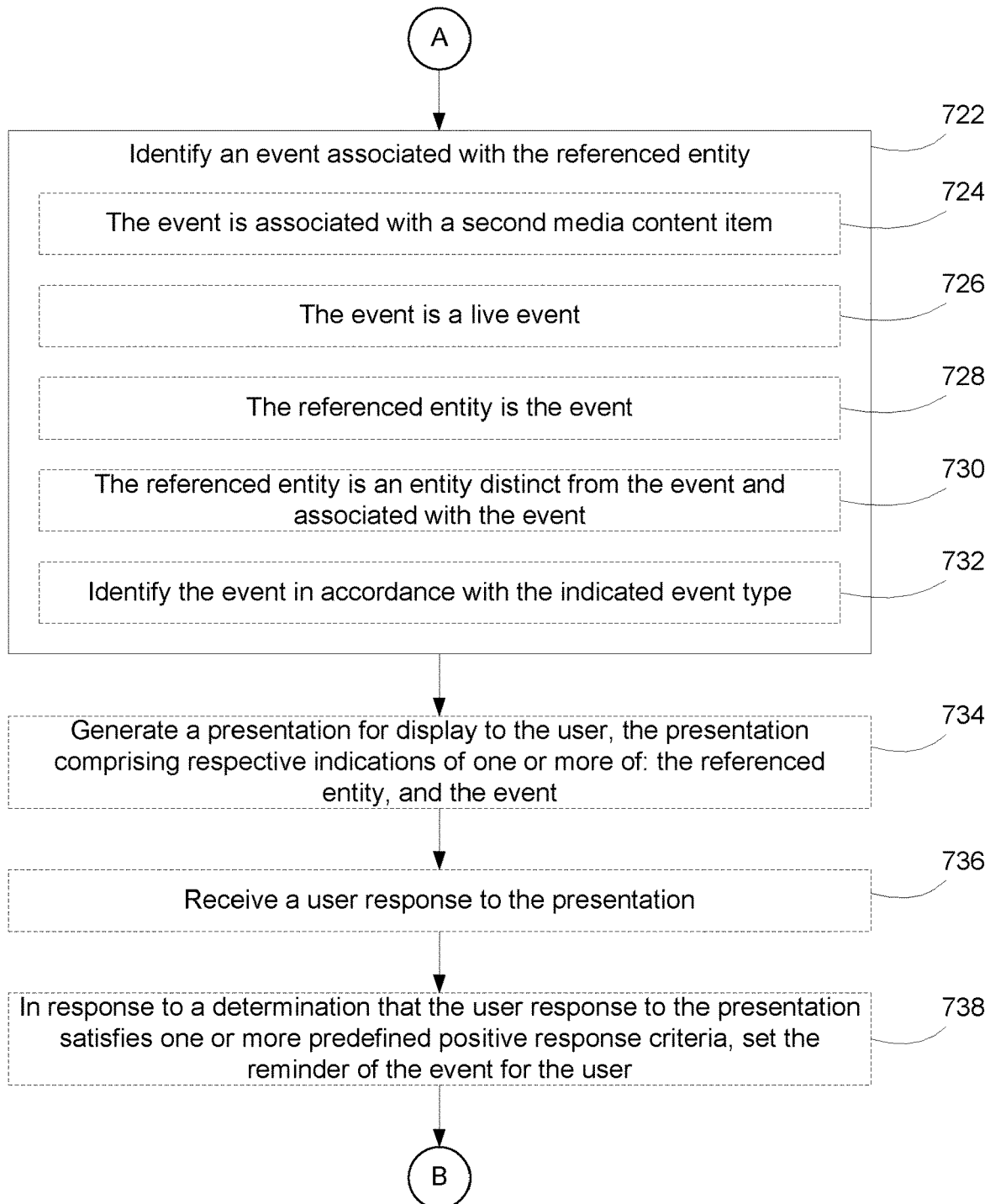
Figure 7C:
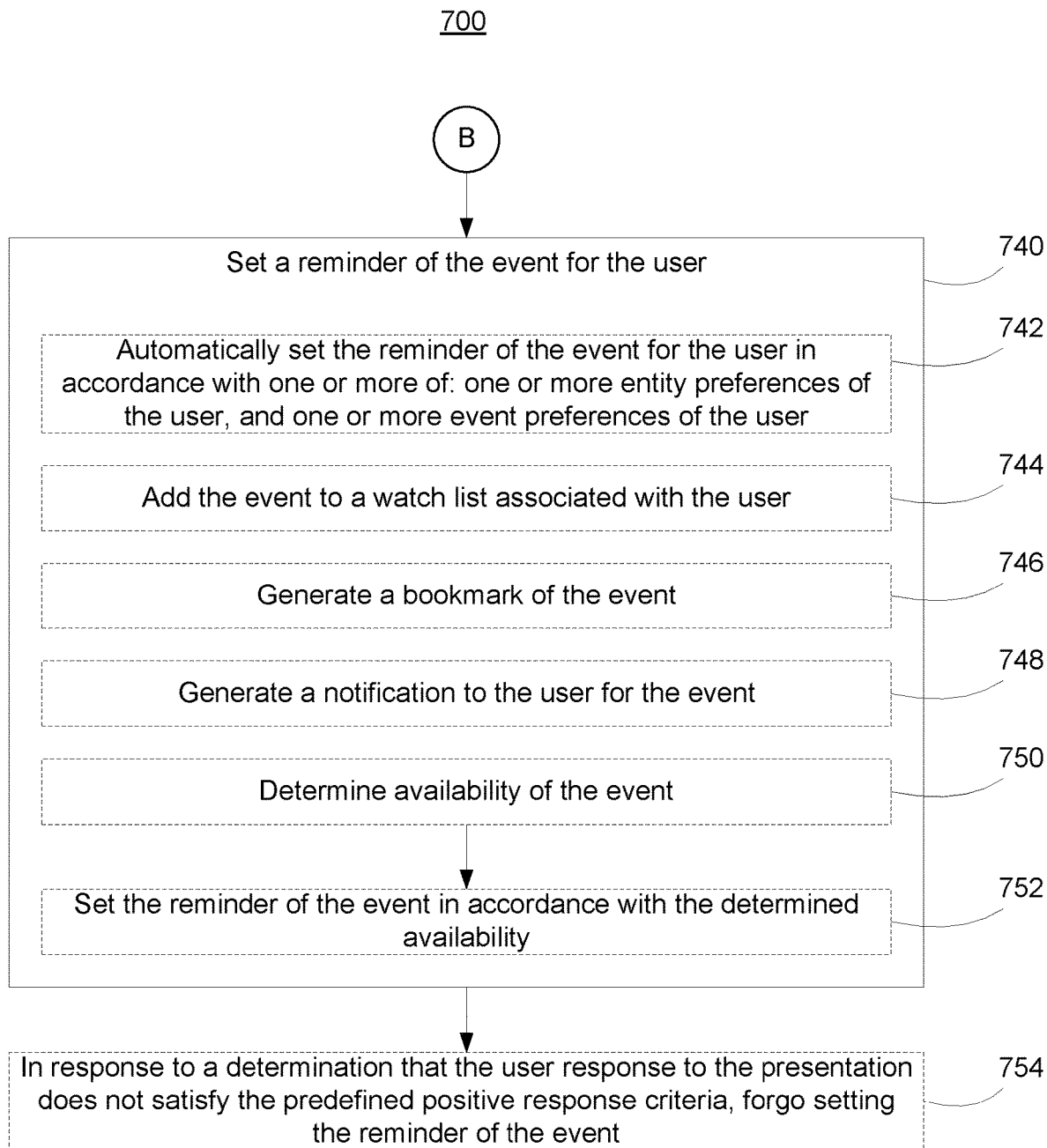

FIGS. 7A-7C illustrate a method of setting a reminder for an event associated with an entity mentioned in media content, in accordance with some implementations. In some implementations, the method is performed at a computer system (e.g., server 106) having one or more processors and memory storing one or more programs for execution by the one or more processors, where the one or more programs include instructions for performing the method. In some implementations, the one or more programs is stored in a non-transitory computer readable storage medium; the memory is a non-transitory computer readable storage medium.

The computer system receives (702) a request from a user. For example, while media content 126 is playing at a client device 102, the user utters a request to set a reminder for an event associated with an entity mentioned or referenced in the media content 126 (e.g., "Remind me when that movie is available to buy on Blu-ray," FIG. 6A). The request is received by the client device 140 (e.g., the assistant application 127-3) and sent to the server 106. In some implementations, the request is displayed on the client device 140 (e.g., by the assistant application 127-3 in user interface 604) to the user, for the user to confirm or cancel.

In response to the user request (708), the computer system identifies (710) a first media content item playing on a first client device concurrently with the user request. The server 106 (e.g., the content identification module 118) identifies the media content item 126 playing when the user request was received.

The computer system identifies (714) a playback position in the first media content item temporally proximate to the user request. The server 106 (e.g., the content identification module 118) identifies how far playback of the media content item 126 has progressed when the user request was received.

The computer system identifies (718) a reference to an entity within a content portion of the first media content item, where the content portion corresponds to the identified playback position. The server 106 (e.g., the entities module 144) identifies one or more entities mentioned or referenced in a portion of the media content item 126 at or around the identified playback position (e.g., the portion includes a predefined amount of time before and after the identified position). For example, the entities module 144 may identify, based on subtitles data for the identified playback position in the media content item 126, a movie title mentioned in spoken speech in the media content item 126 around the identified playback position. In some implementations, if the server 106 identifies multiple entities, the server 106 determines and selects one of the entities based on one or more criteria (e.g., whether the entity matches an entity classification specified or implied in a word or phrase in the request, whether the entity is one preferred by the user as specified in preferences 249). In some implementations, the user command module 252 identifies one or more specified parameters (e.g., entity type, the sex of the referenced performer entity) in the user request, which the server 106 may use to narrow the set of possible entities to be identified.

The computer system identifies (722) an event associated with the referenced entity. The server 106 (e.g., the event reminder module 146) identifies one or more events associated with the identified entity or entities mentioned in the media content item 126. For example, if the identified entity is a movie, the server 106 may identify one or more showtimes for the movie in theaters or television and/or posted dates for availability of the movie on streaming or physical media. In some implementations, the server 106 identifies the events based on information stored at the server 106 (e.g., in the entities database 122) and/or hosted at third-party hosts 170, such as movie showtime information, television program air dates, event schedules, and streaming content release announcements. In some implementations, if the server 106 identifies multiple events, the server 106 selects one of the events based on one or more criteria (e.g., whether the event matches an event classification specified or implied in a word or phrase in the request, whether the event is of a type preferred by the user as specified in preferences 249). In some implementations, one or more parameters (e.g., date range, location, etc.) determined by the user command module 252 from the user request may be used by the server 106 to narrow the set of possible events to be identified.

The computer system sets (740) a reminder of the event for the user. The server 106 (e.g., the event reminder module 146) sets a reminder of the event by, for example, adding the event to a calendar associated with the user as a calendar event with corresponding alerts, adding an entry corresponding to the entity to a watch list, adding a bookmark to the event, and so on.

In some implementations, the user request is received from a second client device distinct from the first client device (704). The request is received from a client device different from the client device on which the media content item is playing. For example, the request is received from client device 140 while the media content item 126 is playing on client device 102.

In some implementations, the user request includes an indication of an event type (706), and identifying an event associated with the referenced entity includes identifying (732) the event in accordance with the indicated event type. The request may include one or more words and phrases that explicitly or implicitly specify an event type. For example, the request repeated back to the user in prompt 606, FIG. 6A, include the words "available to buy on Blu-ray" in conjunction with the word "movie." These words implicitly specify the event as availability date for purchasing the movie on physical media (specifically, in this case, Blu-ray disk). As another example, the request may say "remind me next time she is having a concert here." In this example, the request explicitly specifies the event type "concert." In either example, the server 106 identifies events in accordance with the explicit or implicit specification of the event type (Blu-ray release date in the first example, concert date in the second example). In some implementations, the indication of event type in the request is determined by the user command module 252.

In some implementations, identifying a first media content item includes identifying the first media content item based on one or more of: metadata corresponding to the first media content item, subtitles data of the first media content item, a fingerprint of the first media content item, and a watermark of the first media content item (712). The server 106 can identify the media content item 126 based on metadata from the media content item 126, subtitles data of the media content item 126, a fingerprint of the media content item 126 (e.g., a fingerprint 232 retrieved from fingerprint database 120), and/or a watermark of the media content item 126.

In some implementations, identifying a playback position in the first media content item includes identifying the playback position based on one or more of: metadata corresponding to the first media content item, subtitles data of the first media content item, a fingerprint of the first media content item, and a watermark of the first media content item (716). The server 106 can identify the playback position in the media content item 126 based on metadata from the media content item 126, subtitles data of the media content item 126 (e.g., matching speech in the content information 360 to text portions in the subtitles data), a fingerprint of the media content item 126 (e.g., a fingerprint 232 retrieved from fingerprint database 120), and/or a watermark of the media content item 126.

In some implementations, identifying a reference to an entity includes identifying the reference to the entity based on one or more of: subtitles data of the first media content item, optical character recognition of text in the first media content item, and speech-to-text conversion of speech in the first media content item (720). The server 106 can identify the playback position in the media content item 126 based on metadata from the media content item 126, subtitles data of the media content item 126 (e.g., matching speech in the content information 360 to text portions in the subtitles data), a fingerprint of the media content item 126 (e.g., a fingerprint 232 retrieved from fingerprint database 120), and/or a watermark of the media content item 126.

In some implementations, the event is associated with a second media content item (724). The identified event may be associated with a second media content item different from the media content item 126 playing at the client device 102; the second media content item corresponds to the identified entity mentioned in the media content item 126 around the identified playback position. For example, the identified entity may be a movie mentioned in spoken speech in the media content item 126 at the identified position, and the event is availability of the movie on a streaming platform.

In some implementations, the event is a live event (726). The event, for example, may be a concert, a live sporting event, a speech by a public figure, and so on.

In some implementations, the referenced entity is the event (728). The referenced entity itself may be the event for which the user is requesting a reminder to be set. For example, the referenced entity may be the motorsports race "Daytona 500," which is itself an event with a date and time, tickets for live attendance, and television airtime.

In some implementations, the referenced entity is an entity distinct from the event and associated with the event (730). For example, the referenced entity may be a musician, and the event is a concert in which the musician performs.

In some implementations, the computer system generates (734) a presentation for display to the user, the presentation including respective indications of one or more of: the referenced entity, and the event. The computer system receives (736) a user response to the presentation. The computer system, in response to a determination that the user response to the presentation satisfies one or more predefined positive response criteria, sets (738) the reminder of the event for the user. The computer system, in response to a determination that the user response to the presentation does not satisfy the predefined positive response criteria, forgoes (754) setting the reminder of the event. The server system 106 (e.g., the the event reminder module 146) generates a presentation (e.g., prompt 610 or 614) and sends the presentation to the client device (e.g., client device 102 or 140), where the presentation is displayed to the user. The presentation indicates to the user the identified entity and/or the identified event for which a reminder will be set. For example, prompts 610 and 614 (FIGS. 6B, 6D) indicate to the user the identified entity ("A Great Movie!," "Jane Smith") and the identified event (Blu-ray on-sale date, concert in San Francisco on Feb. 10, 2016). The user responds to the presentation. Depending on the particular implementations, possible responses include performing a particular action with respect to the presentation (e.g., tapping on the prompt 610 or 614, saying "Cancel" or "OK") or ignoring the presentation (e.g., leaving the prompt displayed without taking any action with respect to the presentation. If the action or inaction meets the one or more criteria for a positive response (e.g., the action is one indicating approval or confirmation of the indicated identified entity and/or identified event, the inaction is treated as implicit approval/confirmation), the server 106 proceeds to set the reminder of the event for the user in accordance with step 740 described above. If the action or inaction does not meet the one or more criteria for a positive response, or meets one or more criteria for a negative response (e.g., the action is one indicating disapproval or non-confirmation of the indicated identified entity and/or identified event, the inaction is treated as implicit disapproval/non-confirmation), the server 106 forgoes setting the reminder of the event for the user. In some implementations, the presentation prompts the user to confirm the event as indicated or specify a different event, date, location, etc., or to select from multiple choices (e.g., different dates for a concert). In some implementations, the presentation includes an indication of a mode of the reminder (e.g., notification, bookmark, calendar entry, entry in watch list, etc.) and prompts the user to confirm the mode as indicated or to specify a different mode.

In some implementations, setting the reminder of the event for the user includes automatically setting the reminder of the event for the user in accordance with one or more of: one or more entity preferences of the user, and one or more event preferences of the user (742). If the identified entity and/or identified event matches the preferences 249 specified by the user, the server 106 may omit generating and sending a presentation to the user of the identified entity and/or identified event to the client device 103/140, for the user to confirm the identified entity and/or identified event, before setting the reminder; the server 106 automatically sets the reminder without confirmation from the user. In some implementations, the reminder is set automatically in accordance with additional user preferences 249 (e.g., preferences regarding the mode of the reminder, etc.).

In some implementations, setting the reminder of the event for the user includes adding the event to a watch list associated with the user (744). The event reminder module 146 may set the reminder by adding the event to a watch list 248. For example, for a television show, the event reminder module 146 may add the air time for the next new episode to the watch list 248.

In some implementations, setting the reminder of the event for the user includes generating a bookmark of the event (746). The event reminder module 146 may set the reminder by adding a bookmark for the event reminders 246. The bookmark may be, for example, a bookmark for a page describing a live event and offering tickets to the live event (e.g., a page for a concert), or a bookmark for a page where a movie can be streamed.

In some implementations, setting the reminder of the event for the user includes generating a notification to the user for the event (748). The event reminder module 146 sets and generates a notification to the user, sent to the client device 102/140, of the event.

In some implementations, setting the reminder includes determining (750) availability of the event, and setting (752) the reminder of the event in accordance with the determined availability. The server 106 (e.g., the availability module 150) determines the availability of the identified event based on, for example, information obtained from third party hosts 170, such as ticket availability information and release date information. The event reminder module 146 sets the reminder based on the determined availability. For example, for a movie release on a particular platform, the event reminder module 146 sets the reminder for the date of release as determined from release date information. For a live event, the event reminder module 146 may set a reminder for the earliest future iteration of the live event for which tickets are still available as determined from the ticket availability information.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a server system having one or more processors and memory storing one or more programs for execution by the one or more processors:
   receiving from a first device:
   (i) a request from a user indirectly referencing a media content item; and
   (ii) content information including one or more portions of audio and/or video components of media detected by the first device, the media having originated from a third party content provider independent of the server system; and
   in response to receiving the user request and the content information from the first device:
   matching the content information received from the first device to a portion of content stored in the server system; and
   identifying the media content item based on the matching.

2. The method of claim 1, wherein the user request includes a word or phrase communicated by the user indirectly referencing the media content item, the method further comprising, in response to receiving the user request:
   identifying using the content information received from the first device a playback position in the identified media program within a predefined time period from the user request; and
   identifying an entity, consistent with the word or phrase, referenced by or included in a portion in a content portion of the identified media content item, wherein the content portion corresponds to the identified playback position.

3. The method of claim 2, further comprising, in response to identifying the entity:
   identifying an event associated with the entity consistent with the word or phrase; and
   setting a reminder of the event from the user.

4. The method of claim 3, further comprising:
   generating a presentation for display to the user, the presentation comprising respective indications of one or more of: the entity, and the event;
   receiving a user response to the presentation;
   in response to a determination that the user response to the presentation satisfies one or more predefined positive response criteria, setting the reminder of the event for the user; and
   in response to a determination that the user response to the presentation does not satisfy the predefined positive response criteria, forgoing setting the reminder of the event.

5. The method of claim 3, wherein setting the reminder of the event for the user comprises:
   automatically setting the reminder of the event for the user in accordance with one or more of: one or more entity preferences of the user, and one or more event preferences of the user.

6. The method of claim 3, wherein the event is associated with a second media program.

7. The method of claim 3, wherein the entity is an entity distinct from the event and associated with the event.

8. The method of claim 3, wherein setting the reminder of the event for the user comprises adding the event to a watch list associated with the user or generating a bookmark of the event.

9. The method of claim 3, wherein setting the reminder of the event for the user comprises generating a notification to the user for the event.

10. The method of claim 3, wherein setting the reminder comprises:
    determining availability of the event; and
    setting the reminder of the event in accordance with the determined availability.

11. The method of claim 3, wherein:
the user request includes an indication of an event type; and
identifying an event associated with the entity comprises identifying the event in accordance with the indicated event type.

12. The method of claim 1, wherein the user request is received from a second device distinct from the first device.

13. The method of claim 1, wherein identifying a media content item comprises identifying the media content item based on one or more of: metadata corresponding to the media program, subtitles data of the media program, a fingerprint of the media program, and a watermark of the media program.

14. A server system, comprising:
one or more processors;
memory; and
one or more programs, wherein the one or more programs are stored in the memory and configured to be executed by the one or more processors, the one or more programs including instructions for:
  receiving from a first device:
    (i) a request from a user indirectly referencing a media content item; and
    (ii) content information including one or more portions of audio and/or video components of media playing in proximity to the first device in response to the user request, the media having originated from a third party content provider independent of the server system; and
  in response to receiving the user request and the content information from the first device:
    matching the content information received from the first device to a portion of content stored in the server system; and
    identifying the media content item based on the matching.

15. The system of claim 14, wherein the user request includes a word or phrase communicated by the user indirectly referencing the media content item, and wherein the system further comprises instructions for:
  identifying using the content information received from the first device a playback position in the identified media program within a predefined time period from the user request; and
  identifying an entity, consistent with the word or phrase, referenced by or included in a portion in a content portion of the identified media content item, wherein the content portion corresponds to the identified playback position.

16. The system of claim 15, further comprising instructions for, in response to identifying the entity:
  identifying an event associated with the entity consistent with the word or phrase; and
  setting a reminder of the event from the user.

17. The system of claim 16, further comprising instructions for:
  generating a presentation for display to the user, the presentation comprising respective indications of one or more of: the entity, and the event;
  receiving a user response to the presentation;
  in response to a determination that the user response to the presentation satisfies one or more predefined positive response criteria, setting the reminder of the event for the user; and
  in response to a determination that the user response to the presentation does not satisfy the predefined positive response criteria, forgoing setting the reminder of the event.

18. A non-transitory computer readable storage medium storing one or more programs, the one or more programs comprising instructions which, when executed by a server system with one or more processors, cause the server system to:
  receive from a first device:
    (i) a request from a user indirectly referencing a media content item; and
    (ii) content information including one or more portions of audio and/or video components of media playing in proximity to the first device in response to the user request, the media having originated from a third party content provider independent of the server system; and
  in response to receiving the user request and the content information from the first device:
    match the content information received from the first device to a portion of content stored in the server system; and
    identify the media content item based on the matching.

19. The computer readable storage medium of claim 18, wherein the user request includes a word or phrase communicated by the user indirectly referencing the media content item, and wherein the computer readable storage medium further comprises instructions which, when executed by the server system, cause the server system to:
  identify using the content information received from the first device a playback position in the identified media program within a predefined time period from the user request; and
  identify an entity, consistent with the word or phrase, referenced by or included in a portion in a content portion of the identified media content item, wherein the content portion corresponds to the identified playback position.

20. The computer readable storage medium of claim 19, further comprising instructions which, when executed by the server system, cause the server system to, in response to identifying the entity:
  identify an event associated with the entity consistent with the word or phrase; and
  set a reminder of the event from the user.

* * * * *